US012750128B2

(12) United States Patent
Jong et al.

(10) Patent No.: US 12,750,128 B2
(45) Date of Patent: Sep. 29, 2026

(54) BEAM HOPPING METHODS FOR NEXT-GENERATION INTEGRATED TERRESTRIAL-NON-TERRESTRIAL NETWORKS

(71) Applicant: Hughes Network Systems, LLC, Germantown, MD (US)

(72) Inventors: James Jehong Jong, North Potomac, MD (US); Channasandra Ravishankar, Clarksburg, MD (US); Bala Subramanian, Potomac, MD (US); John E. Corrigan, III, Miami Beach, FL (US)

(73) Assignee: Hughes Network Systems, LLC, Germantown, MD (US)

( * ) Notice: Subject to any disclaimer, the term of this patent is extended or adjusted under 35 U.S.C. 154(b) by 309 days.

(21) Appl. No.: 18/656,888

(22) Filed: May 7, 2024

(65) Prior Publication Data

US 2025/0240087 A1 Jul. 24, 2025

Related U.S. Application Data

(60) Provisional application No. 63/622,752, filed on Jan. 19, 2024.

(51) Int. Cl.
*H04B 7/185* (2006.01)

(52) U.S. Cl.
CPC ................................ *H04B 7/18513* (2013.01)

(58) Field of Classification Search
CPC .......................... H04B 7/18513; H04B 7/2041
See application file for complete search history.

(56) References Cited

U.S. PATENT DOCUMENTS 6,522,643 B1 2/2003 Jacomb-hood et al.
2019/0349073 A1* 11/2019 Regunathan ........ H04L 27/2655
(Continued)

FOREIGN PATENT DOCUMENTS

EP 3780416 A1 2/2021

OTHER PUBLICATIONS

Shadab, et al., "Revolutionizing Future Connectivity: A Contemporary Survey on AI-Empowered Satellite-based Non-Terrestrial Networks in 6G", Cornell University Library, Jun. 9, 2023, 40 pages.

(Continued)

*Primary Examiner* — Jay P Patel
*Assistant Examiner* — Shehab A Alawdi
(74) *Attorney, Agent, or Firm* — Kilpatrick Townsend & Stockton LLP

(57) ABSTRACT

Beam hopping (BH) approaches are described herein for integrated terrestrial-non-terrestrial network (iTNTNs) having a terrestrial radio access network integrated with multi-beam satellite communications. A macro-level BH configuration can be generated, based on present and projected network data, to include synchronized traffic channel and acquisition channel BH cycles, each with respective cycle durations and dwell resolutions. The configuration can also include a PNT channel BH cycle with its own cycle duration and dwell resolution for use by a dedicated PNT beam. The macro-level configuration can be used to define a micro-level configuration for each of multiple traffic and control (TnC) beams, including certain time slots for cell acquisition and remaining time slots for allocating TnC communications to cells in proportion to their traffic demands. Concurrent beam hopping by the TnC Beams and the PNT beam in accordance with the BH cycle configurations provides effi-
(Continued)

cient multiplexing of traffic, control, and PNT communications.

20 Claims, 13 Drawing Sheets

(56) References Cited

U.S. PATENT DOCUMENTS

2020/0084736 A1 3/2020 Regunathan et al.
2025/0141535 A1* 5/2025 Liu .................... H04B 7/18513

OTHER PUBLICATIONS

Rohde, et al., "Beam-hopping System Configuration and Terminal Synchronization Schemes [international Communications Satellite Systems Conference]", 37th International Communications Satellite Systems Conference (ICSSC-2019), Oct. 29, 2019, 13 pages.
Chuberre, N., et al., "Study on NR to support Non-Terrestrial Networks", Release-15, RP-171450, *3GPP (3rd Generation Partnership Project) TSG (Technical Specification Group) RAN (Radio Access Network) WG1 (Working Group 1), Meeting 88bis*, West Palm Beach, FL, Jun. 5-9, 2017, 5 pages.
Chuberre, N., "Study on solutions for NR to support non-terrestrial networks (NTN)", Release-16, RP-190710, *3GPP (3rd Generation Partnership Project) TSG (Technical Specification Group) RAN (Radio Access Network), Meeting 83*, Shenzen, China, Mar. 18-19, 2019, 6 pages.
Chuberre, N., "Solutions for NR to support non-terrestrial networks (NTN)", Release-17, RP-211784, *3GPP (3rd Generation Partnership Project) TSG (Technical Specification Group) RAN (Radio Access Network), Meeting #93-e*, e-meeting, Sep. 13-17, 2021, 10 pages.
3GPP (3rd Generation Partnership Project), "Study on using Satellite Access in 5G", Release-16, Technical Report 22.822, V1.0.0, May 2018, 35 pages.
3GPP (3rd Generation Partnership Project), "Service requirements for the 5G system", Release-19, Technical Specification 22.261, V19.6.0, Mar. 2024, 142 pages.
Michel, C., "Study on architecture aspects for using satellite access in 5G", SP-181253, *TSG (Technical Specification Group) SA (System Aspects) Meeting #SP-82*, Sorrento, Italy, Dec. 12-14, 2018, 6 pages.
3GPP (3rd Generation Partnership Project), "Study on architecture aspects for using satellite access in 5G", Release-17, Technical Report, 23.737, V17.1.0, Jul. 2020, 92 pages.
Michel, C., "Integration of satellite systems in the 5G architecture", SP-191335, *3GPP (3rd Generation Partnership Project) TSG (Technical Specification Group) SA (System Aspects) Meeting #86*, Sitges, Spain, Dec. 10-13, 2019, 3 pages.
Michel, C., "Study on management and orchestration aspects with integrated satellite components in a 5G network", SP-190138, *3GPP (3rd Generation Partnership Project) TSG (Technical Specification Group) SA (System Aspects) Meeting #83*, Shenzhen, China, Mar. 20-22, 2019, 3 pages.
Catovic, A., "CT aspects of 5GC architecture for satellite networks", CP-203235, *3GPP (3rd Generation Partnership Project) TSG-CT (Technical Specification Group Core Network and Terminals) Meeting #90e*, e-Meeting, Dec. 6-8, 2020, 4 pages.
3GPP (3rd Generation Partnership Project), "Study on PLMN selection for satellite access ", Release-17, Technical Report, 24.821, V2.0.0, Sep. 2021, 48 pages.
Charbit, G., et al., "Study on NB-Io/eMTC support for Non-Terrestrial Network", Release-17, RP-193235, *3GPP (3rd Generation Partnership Project) TSG (Technical Specification Group) RAN (Radio Access Network)*, Meeting #86, Sitges, Spain, Dec. 9-31, 2019, 4 pages.
Lin, X., et al,, "5G from Space: An Overview of 3GPP Non-Terrestrial Networks," in *IEEE Communications Standards Magazine*, vol. 5, No. 4, pp. 147-153, Dec. 2021, doi: 10.1109/MCOMSTD.011.2100038.
Panaitopol, D., et al., "Way Forward on NTN_solutions_Part1", R4-2115640, *3GPP (3rd Generation Partnership Project) TSG (Technical Specification Group) RAN (Radio Access Network) WG4 (Working Group 4)*, Meeting #100-e, e-Meeting, Aug. 16-27, 2021, 21 pages.
ITU-R (International Telecommunication Union Radiocommunication Sector), "Frequency arrangements for implementation of the terrestrial component of International Mobile Telecommunications in the bands identified for IMT in the Radio Regulations", M. 1036-7 Series, Dec. 2023, 31 pages.
El-Sheikh, S., "Implementation of International Mobile Telecommunications in the frequency bands 1 885-2025 MHz and 2 110-2 200 MHz", Resolution 212 (Rev. WRC-19), *The World Radiocommuncation Conference*, 2019, 4 pages.
3GPP (3rd Generation Partnership Project), "Non-Access-Stratum (NAS) functions related to Mobile Station (MS) in idle mode", Release-18, Technical Specification 23.122, V18.6.0, Mar. 2024, 155 pages.
3GPP (3rd Generation Partnership Project), "Characteristics of the Universal Subscriber Identity Module (USIM) application", Release-18, Technical Specification 31.102, V18.4.0, Mar. 2024, 396 pages.
"5G and Non-Terrestrial Networks", *A 5G Americas White Paper*, Feb. 2022, 35 pages.

* cited by examiner

BEAM HOPPING METHODS FOR NEXT-GENERATION INTEGRATED TERRESTRIAL-NON-TERRESTRIAL NETWORKS

CROSS-REFERENCES TO RELATED APPLICATION

This application claims priority to U.S. Provisional Patent Application No. 63/622,752 filed Jan. 19, 2024, entitled "5G NR BEAM HOPPING METHODS FOR NTN," the entire disclosure of which is hereby incorporated by reference, for all purposes, as if fully set forth herein.

BACKGROUND OF THE INVENTION

Wireless connectivity continues to evolve to meet demands for ubiquity, convenience, reliability, speed, responsiveness, and the like. For example, each new generation of cellular communication standards, such as the move from 4G/LTE (fourth generation long-term evolution) networks to 5G (fifth generation) networks, has provided a huge leap in capabilities along with new and increasing demands on the infrastructures that enable those networks to operate. For example, 5G supports innovations, such as millimeter-wave frequencies, massive MIMO (Multiple Input Multiple Output), and network slicing, which enhance connectivity for unprecedented numbers of devices and data-intensive applications.

More recently, innovations in 5G networking (and its successors) have expanded from terrestrial-based communication infrastructures to so-called non-terrestrial network (NTN) infrastructures. NTN infrastructures leverage satellites and high-altitude platforms to extend 5G coverage and capabilities, such as to serve remote and otherwise underserved areas. Effective deployment of NTN solutions can help support connectivity and applications for rural users, emergency responders, global Internet-of-Things (IoT) deployments, etc.

However, non-terrestrial communications carry complexities and design concerns that are not present in terrestrial-based communications, which can add significant technical hurdles to NTN deployments. For example, effective ground-to-satellite communications involves accounting for orbital dynamics, handovers and/or other transitions between satellites, path loss, propagation delay, atmospheric conditions, inter-satellite and/or inter-beam interference, spectrum and regulatory considerations, and other considerations. New approaches continue to be developed to find technical solutions for overcoming, or at least mitigating, these and other technical hurdles.

BRIEF SUMMARY OF THE INVENTION

Systems and methods are described herein for implementing beam hopping (BH) in an integrated terrestrial-non-terrestrial network (iTNTN). The iTNTN can include a satellite radio access network (SRAN) in communication with a multi-beam satellite communication system (e.g., including one or more non-geostationary orbit (NGSO) satellites and/or one or more geosynchronous Earth orbit (GEO) satellites). The SRAN can utilize cellular (e.g., 5G) standards and protocols. Embodiments generate a macro-level BH configuration generated, based on present network data and on a projected demand for satellite resources, that defines at least traffic and acquisition cycle durations and traffic and acquisition dwell resolutions for traffic channel and acquisition channel BH cycles. The cycles can be generated so that each acquisition time slot has a duration that is a multiple of that of the traffic time slots. The macro-level BH configuration can further define a PNT channel BH cycle with its own time slots and duration.

Embodiments can use the macro-level BH configuration and present network data to further generate corresponding micro-level BH configurations that defines, for each beam of the multi-beam satellite communication system, a first set of dwell time slots to use for cell acquisition by the beam and a second set of dwell time slots to use for traffic and control (TnC) communications. The second set of dwell time slots forms traffic channel BH cycles and can be allocated to cells supported by the beam in proportion to the traffic demands of those cells. Embodiments use the generated cycles to implement concurrent beam hopping of multiple TnC beams and a single PNT beam, thereby efficiently multiplexing traffic, control, and PNT communications.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

Figure 1:
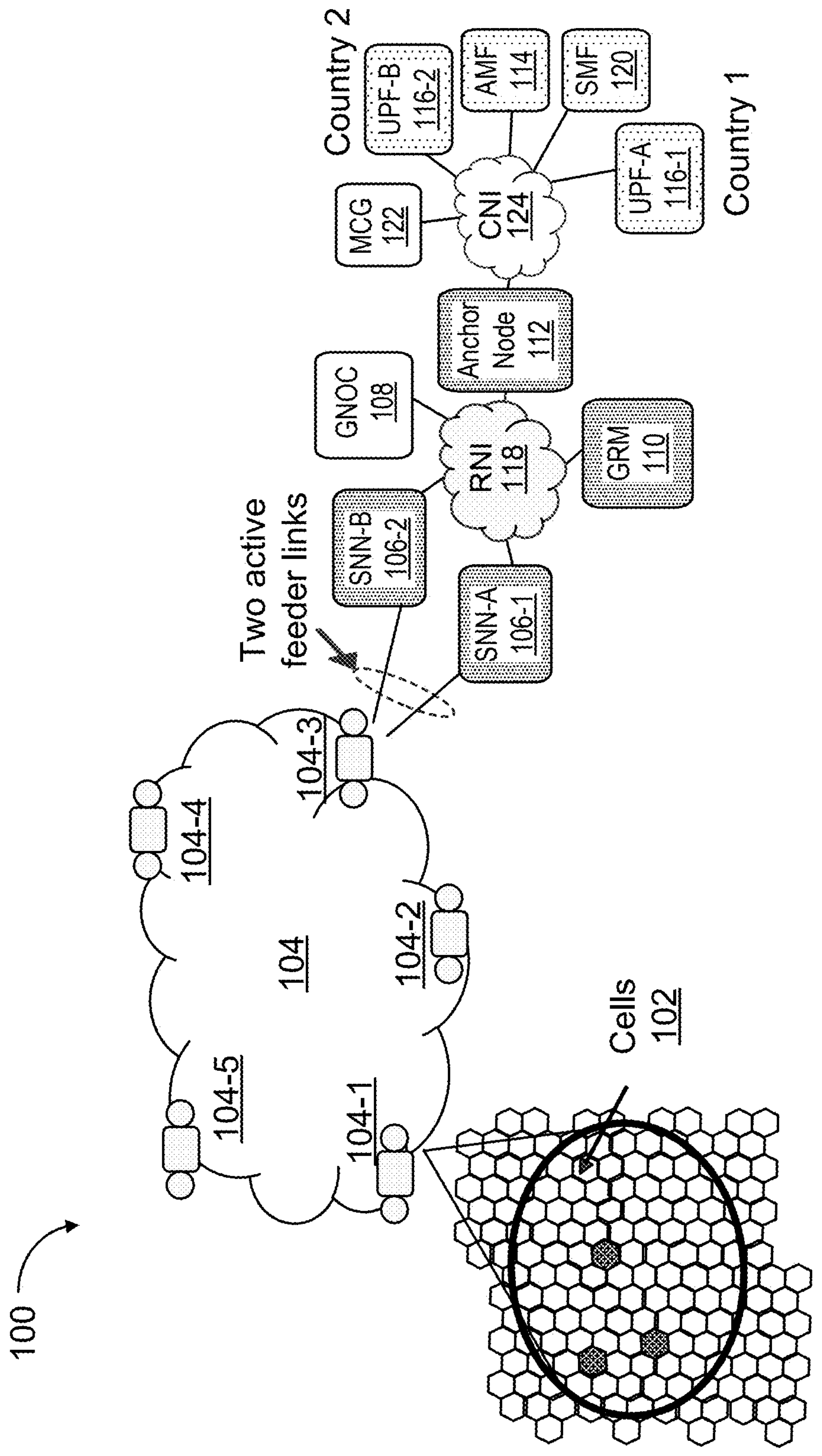
FIG. 1 shows an example network architecture for implementing an integrated terrestrial-non-terrestrial network (iTNTN) with a non-geostationary satellite system.

For the sake of providing context for embodiments described herein, FIG. 1 shows an example network architecture 100 is shown for implementing an integrated terrestrial-non-terrestrial network (iTNTN) with a non-geostationary satellite system. The term integrated terrestrial-non-terrestrial network (iTNTN) is used herein to generally include any type of network that includes an NTN extension of terrestrial network concepts. Different iTNTN deployments can involve different amounts of integration between non-terrestrial and terrestrial network concepts. For example, some iTNTN deployments fully integrate components of the terrestrial and non-terrestrial networks to form an integrated network. In other cases, the iTNTN can operate predominantly (or even solely) with non-terrestrial components without a direct or seamless integration into any terrestrial network infrastructure; the "integration" in such cases being based on integration of terrestrial (e.g., 5G) protocols into satellite communications (e.g., by the satellite radio access network). For example, such an iTNTN can be used in scenarios where terrestrial connectivity is minimal or absent, such as in remote or oceanic regions, and the iTNTN (e.g., a 5G NTN) can be designed to provide connectivity directly from one or more multi-beam satellites to user terminals without routing through terrestrial base stations or a core network. Thus, references to iTNTNs herein broadly include any network deployments in which satellite communication use and/or integrate with terrestrial protocols and standards, such as any 5G NTN deployments.

The network architecture 100 may include one or more user terminals in designated cells 102 illuminated by a satellite network 104 including a plurality of satellites (104-1, 104-2, 104-3 . . . 104-N) communicatively coupled with a ground network. The ground network includes a satellite radio access network (RAN, SRAN) and a core network (CN) in communication via an anchor node 112 (also referred to herein as an anchor processor, AxP). The SRAN can include one or more satellite network nodes (SNNs) 106 (also referred to as SNN sites herein), such as SNN-A 106-1 and SNN-B 106-2; a global network operations center (GNOC) 108; and a global resource manager (GRM) 110. The CN can include an access and mobility function (AMF) module 114, one or more user plane function (UPF) modules 116, a session management function (SMF) 120, and a multicast gateway (MCG) 122. For example, a first UPF 116-1 is in a first country, and a second UPF 116-2 is in a second country.

The illustrated SNNs 106 can be implemented by Ground System Node-Bs (GSNBs), or any suitable network component for facilitating communications and data exchange between the satellites of the satellite network 104 and the ground network infrastructure. For example, the SNNs implement functions relating to relaying data between the satellite network 104 and the ground network, including managing uplink and downlink communications. The SNNs 106 can also help to ensure compatibility between satellite communication protocols and terrestrial network protocols.

User terminals in the cells 102 communicate with the ground network through the satellite network 104. At any given instant of time, the user terminals may communicate on a Ku user link of a satellite and the ground network/node may communicate on Ka/V/Q feeder link of a satellite in the satellite network 104. Other implementations can use any feasible spectrum bands for communications.

As illustrated, the satellites of the satellite network 104 can be implemented as a constellation of satellites. The satellite (for example, SAT3 104-3) with which the ground network/node communicates may be different from the satellite (for example, SAT1 104-1) with which the user terminal (controlled by that ground node) may be communicating. For example, the user terminals are communicating with the SAT1 104-1 to reach the ground node (for example, SNN-A 106-1 or SNN-B 106-2) that is communicating with the SAT3 104-3. Inter-satellite links (ISLs) may be used to establish connectivity between the satellites (104-1, 104-2, 104-3 . . . 104-N) in the satellite network 104. In an example, a lightweight software defined satellite networking concept may be used to find the best route between two satellites in the satellite network 104.

The SNN-A 106-1 and the SNN-B 106-2 may communicate with the SAT3 104-3 through active feeder links, such as the two active feeder links shown in FIG. 1. The SNN-A 106-1, the SNN-B 106-2, the GNOC 108, the RDF 110, and the anchor node 112 may communicate with each other via a RAN network infrastructure (RNI) 118, which can include any one or more suitable networks, such as one or more local-area networks (LANs) and/or wide-area networks (WANs). The GNOC 108 may operate for multiple networks across various geographies from one central location. The AMF module 114, UPF modules 116, SMF module 120, and multicast gateway 122 may communicate with each other via a CN network infrastructure (CNI) 124, which can include any one or more suitable networks, such as one or more LANs and/or WANs. The anchor node 112 can communicatively couple the RNI 118 with the CNI 124.

A person of ordinary skill in the art will understand that there may be any number of user terminals, satellites, or other components in the network architecture 100. As used herein, the user terminal may refer to a wireless device and/or a user equipment (UE). The terms "computing device," "wireless device," "user device," and "user equipment (UE)" may be used interchangeably throughout the disclosure. A user device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, etc.

In an example, the user devices may communicate with the satellite network 104 and/or the ground network and/or the core network via a set of executable instructions residing on any operating system. In an example, the user devices may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device may include one or more in-built or externally coupled accessories including, but not limited to, a visual aid device such as camera, audio aid, a microphone, a keyboard, input devices for receiving input from a user such as touch pad, touch enabled screen, electronic pen, etc. A person of ordinary skill in the art will appreciate that the user devices may not be restricted to the mentioned devices and various other devices may be used.

The satellite network 104 may be communicatively coupled to the user devices in the cell 102 via a network. The satellite network 104 may communicate with the user devices in a secure manner via the network. The network may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiberoptic network, or some combination thereof. In particular, the network may be any network over which the user devices communicate with the satellite network 104.

Although FIG. 1 shows exemplary components of the network architecture 100, in other examples, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100. Various details, features, protocols, and variations of iTNTNs, such as the one of FIG. 1, are described in detail in U.S. patent application Ser. No. 18/408,183, titled "MULTIBEAM NON-GEOSYNCHRONOUS SATELLITE COMMUNICATION WITHOUT ONBOARD WAVEFORM PROCESSING," filed on Jan. 9, 2024; and U.S. patent application Ser. No. 18/602,525, titled "INTER-SATELLITE LINK NETWORKING AND ROUTING FOR MULTIBEAM S-BAND LOW EARTH ORBIT WITH ANALOG FEEDER LINKS," filed on Mar. 12, 2024; the disclosures of all of which are being incorporated herein in their entirety.

Figure 2A:
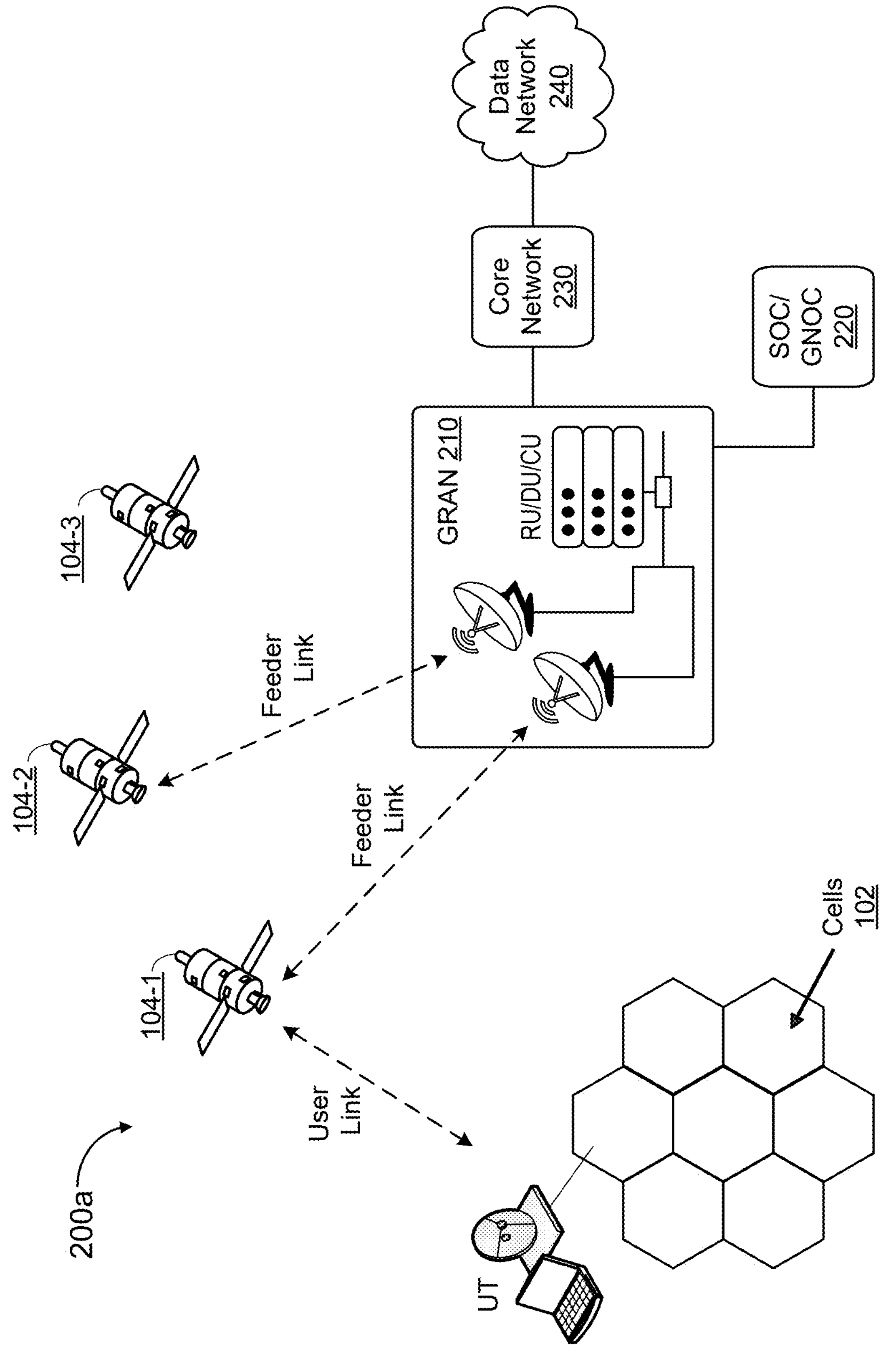
FIGS. 2A-2C show three examples of different types of simplified iTNTN architectures.
Figure 2B:
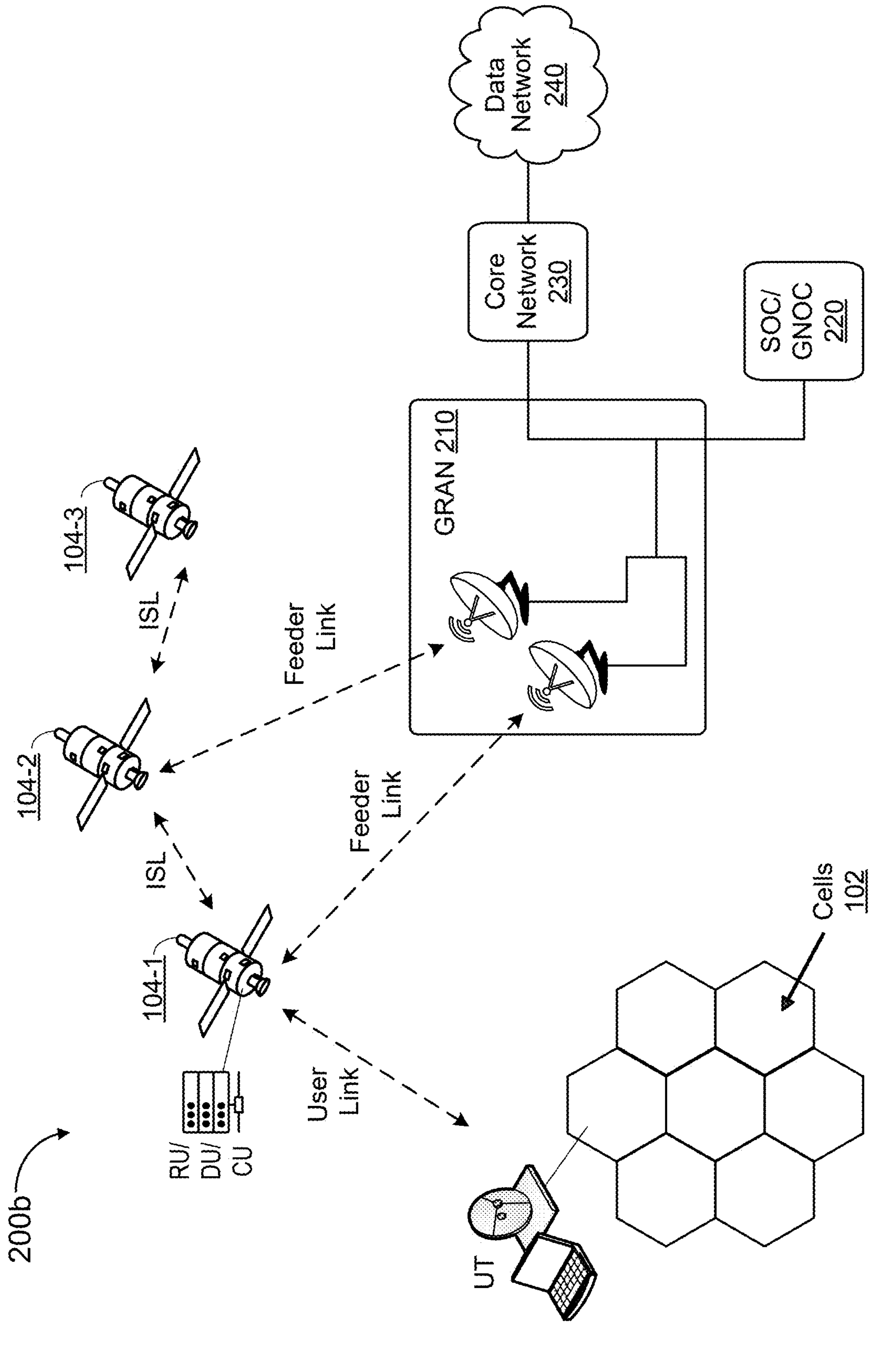
Figure 2C:
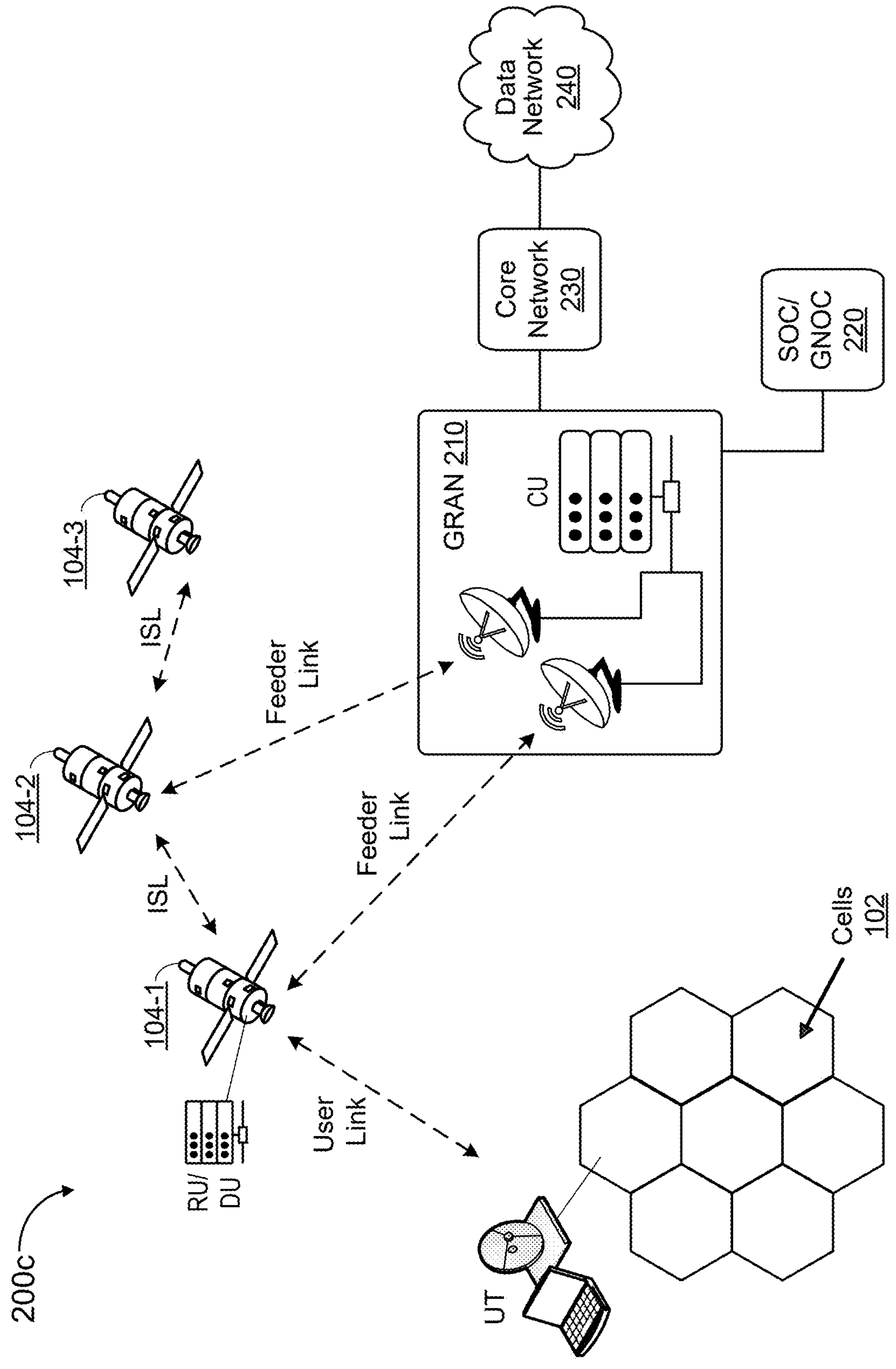

For added context, FIGS. 2A-2C show three examples of different types of simplified iTNTN architectures 200. In each iTNTN architecture 200, user terminals (UTs) are in cells 102 corresponding to geographic regions. Satellites 104 project beams that illuminate the cells 102 to facilitate user-link communications. The satellites 104 can also establish feeder-link communications with gateway terminals of a satellite radio access network (SRAN) 210. The SRAN 210 is in communication with a satellite operations center (SOC) and/or global network operations center (GNOC) (shown as SOC/GNOC 220). The SRAN 210 is also in communication with a terrestrial core network 230, such as a 5G core (5GC) network. The core network can facilitate communications with a data network 240, such as the Internet.

FIG. 2A shows a first illustrative simplified iTNTN architecture 200*a*, in which a terrestrial cellular core network 230 is in communication with transparent (bent pipe) satellites 104 via the SRAN 210. In such an architecture, RAN functions, including radio unit (RU), distributed unit (DU), and central unit (CU) functions, can all be implemented in the SRAN 210. The RU is responsible for transmission and reception of radiofrequency signals and interfaces directly with antennas to convert between analog and digital signal spaces. The DU is responsible for real-time, lower-layer baseband processing, such as physical layer (Layer 1) processing (e.g., error correction, modulation/demodulation, encryption/decryption, etc.), and some media access control (MAC) layer (in Layer 2). The CU is responsible for higher-layer functions, including the non-real-time aspects of the MAC layer and radio link control (RLC), packet data convergence protocol (PDCP), and radio resource control (RRC) layers. The CU tends to perform session management, mobility management, and orchestration of control and management plane functions across the network.

In some implementations, the RAN is architected according to open radio access network (O-RAN) principles and protocols. O-RAN is an architecture that seeks to standardize interfaces between RAN components to allow network operators to mix and match products from different vendors. O-RAN deployments tend to leverage disaggregation, artificial intelligence (AI), machine learning (ML), and/or other technologies for network optimization. For example, embodiments can implement the RU, DU, and CU functions as virtualized network functions (VNFs) with standardized network interfaces. Integration of O-RAN principles into iTNTN deployments can increase flexibility, scalability, and efficiency of the network architecture.

FIG. 2B shows a second illustrative simplified iTNTN architecture 200*b*, in which the terrestrial cellular core network 230 is in communication with regenerative satellites 104 via the SRAN 210. In such an architecture, the RAN functions, including RU, DU, and CU functions, can all be implemented in the satellites 104. Further, the satellites 104 can be in direct communication with each other via inter-satellite links (ISLs), such as optical ISLs. FIG. 2C shows a third illustrative simplified iTNTN architecture 200*c*, in which the terrestrial cellular core network 230 is in communication with regenerative satellites 104 via the SRAN 210, and RAN functions are split between the SRAN 210 and the satellites 104. For example, CU functions are implemented in the SRAN 210, and RU and DU functions are implemented in the satellites 104. As in FIG. 2B, the satellites 104 can be in direct communication with each other via inter-satellite links (ISLs), such as optical ISLs.

Although 5G NR specifications and technologies discuss many aspects of NTN integration, they do not specify or address satellite beam hopping features. In conventional fixed-beam satellites, one or more coverage areas is statically illuminated by one or more beams, and the resources (e.g., bandwidth and power) of the satellite are allocated to those beams, often uniformly. Thus, it can be difficult or impossible for such fixed-beam satellites to adapt to changing demand for those resources over time and/or over geographic space (e.g., in different regions).

Beam hopping is a technique used in satellite communications to optimize the allocation of those satellite resources across different geographic coverage areas by hopping the beams to different coverage areas (e.g., cells) at different times, thereby providing for dynamic adjustment to resource allocations in time and space. The "hopping" refers to selectively activating beams at different times and locations to direct the satellite resources as desired. Beam hopping involves time-division multiplexing (e.g., time-division multiple access, TDMA) and power allocation to enhance efficiency and flexibility. By concentrating a satellite's power and bandwidth on specific areas at specific times, beam hopping can effectively increase the overall system capacity and quality of service. For example, the ability to dynamically focus resources can increase resource efficiency by directing more resources to higher demand regions as needed, can improve service flexibility by dynamically refocusing resources to adapt to changing demand patterns (e.g., peak usage times in certain regions, emergencies, etc.), can increase system capacity by using dynamic allocation of resources to effectively support more users at higher data rates, can increase energy efficiency (and accordingly increase satellite lifespan and reduce operational costs) by concentrating power on active beams to reduce overall energy consumption, and can provide other features.

Figure 3:
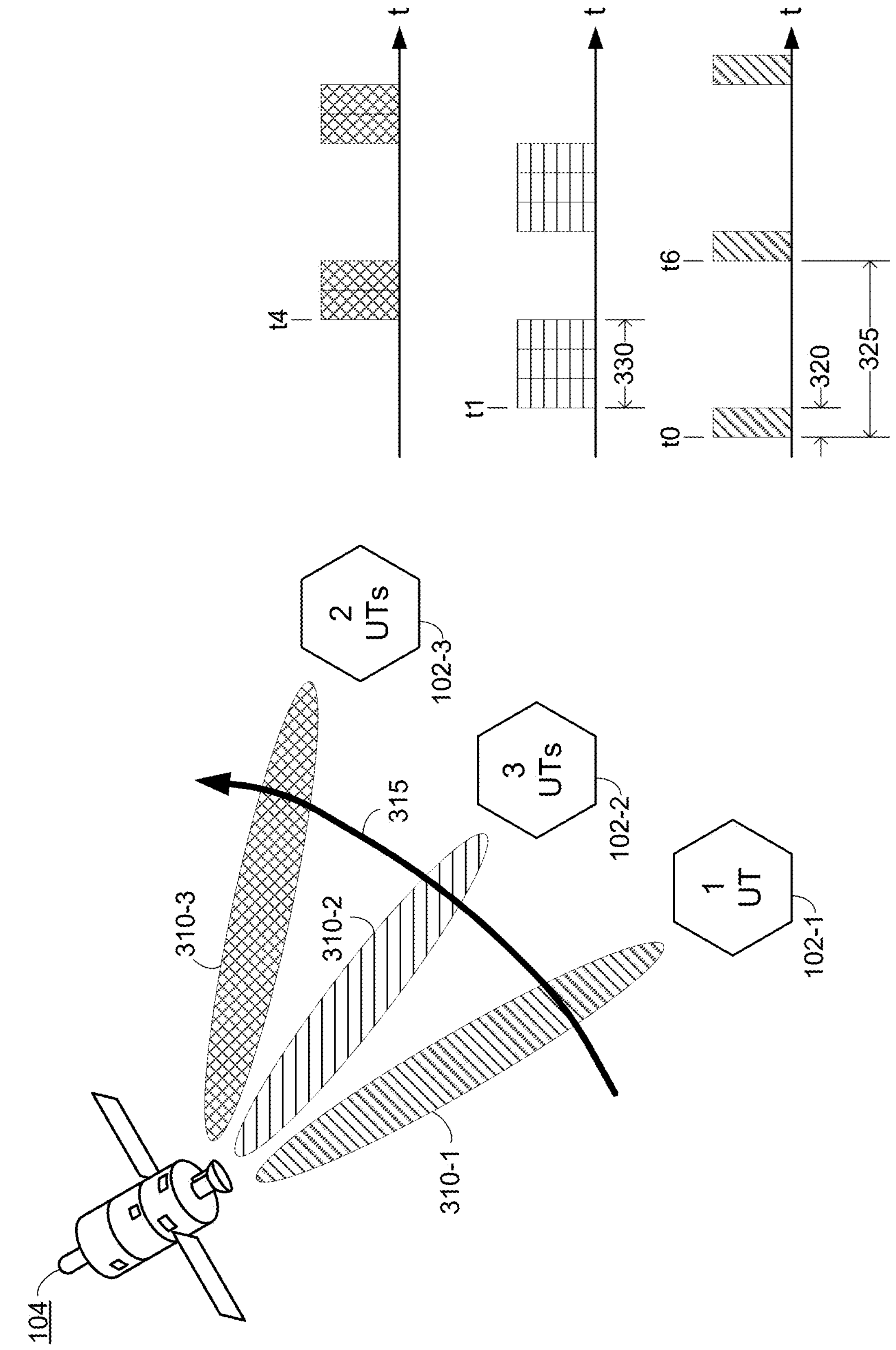
FIG. 3 shows an example of beam hopping in a multi-beam satellite communication system.

FIG. 3 shows an example of beam hopping in a multibeam satellite communication system. For the sake of simplicity, the example assumes a single cell 102 per beam 310;

at each of a sequence of time slots, a satellite 104 activates a beam 310 to illuminate a corresponding cell 102. As used herein, reference to a particular beam 310 as "active," or the like, means that a beam 310 is presently illuminating a particular cell (or group of cells). Some embodiments sequentially activate beams 310 by sequentially switching beams on or off. Other embodiments sequentially activate beams 310 by sequentially steering or forming beams to point at desired locations.

The sequence progresses in accordance with arrow 315. According to nomenclature adopted herein, the sequence includes repeating a "beam hopping cycle" that is divided into "dwell time slots." The beam hopping cycle has a total duration referred to as its "revisit time," which equals some number of dwell time slots. Each beam 310 in the system can be active at certain dwell time slots in the cycle time and inactive at other dwell time slots in the cycle time, according to a beam hopping schedule. Thus, a single dwell time slot is the shortest possible beam dwell duration, and the revisit time is the longest possible time period between activating a particular beam 310 (i.e., which is also the longest time period before revisiting any particular terminal). If a beam 310 is active for multiple dwell time slots sequentially, the sequence of slots in which the beam 310 is active can be referred to as a "beam dwell duration." In some embodiments, for each beam hopping cycle, a beam 310 is active for a number of dwell time slots corresponding to the number of UTs supported in the corresponding cell 102. In cases where a particular beam can be active for multiple, non-sequential dwell time slots in a single cycle time, the number of slots in which the beam is active over the cycle time can be referred to as a "beam slot count."

In the illustrated example, a first cell 102-1 has 1 UT, a second cell 102-2 has 3 UTs, and a third cell 102-3 has 2 UTs. A beam hopping cycle is illustrated as having a revisit time 325 equivalent to 6 dwell time slots 320 (corresponding to the 6 total UTs). For example, the UT in the first cell 102-1 is illuminated once every six dwell time slots 320. A beam hopping cycle is illustrated as beginning at time, t0. The first beam 310-1 is active for a single dwell time slot 320, which is also the minimum beam dwell duration 330. The second beam 310-2 is active for three dwell time slots 320 beginning at time, t1; and the beam 310-2 remains active for a beam dwell duration 330 of three dwell time slots 320. The third beam 310-3 is active for two dwell time slots 320 beginning at time, t4; and the beam 310-3 remains active for a beam dwell duration 330 of two dwell time slots 320. At time, t6 (6 dwell time slots 320 after the beginning of the first beam hopping cycle), the beam hopping cycle repeats.

As noted above, the iTNTN architectures described herein can include one or more non-geostationary orbit (NGSO) satellites and/or one or more geosynchronous Earth orbit (GEO) satellites, integrated with terrestrial radio access and core network infrastructures based on cellular standards (e.g., 5G). For example, the architecture of FIG. 1 shows a particular architectural approach that uses a constellation of NGSO satellites that can communicate with each other via ISLs. NGSO satellites can generally include low earth orbit (LEO) and medium earth orbit (MEO) constellations. Such NGSO satellites constantly move relative to the Earth's surface as it traverses its orbit, so that the cells covered by any particular satellite will constantly change over time, thereby resulting in a potentially high variance in resource demand for its beams over time. Beam hopping can be used to dynamically allocate satellite resources to meet rapid and continuous changes in demand as the satellites traverse their orbits.

In GEO systems, the satellite maintains a fixed position relative to the Earth, which can allow for a consistent overall coverage area of the satellite and/or a static correspondence between a satellite's beams and particular coverage areas where those beams are focused. Beam hopping can be used in GEO systems to dynamically activate and/or point selected beams at selective geographical regions in a manner that adapts to temporal changes in demand. For example, beam hopping can be used to adapt to predictably varying internet traffic throughout a day, to high-viewership events, etc.

To date, beam hopping has not been implemented in the context of iTNTN architectures. Indeed, doing so involves overcoming several technical hurdles. One such hurdle is that implementing beam hopping involves designing sophisticated scheduling algorithms to determine when and where to allocate resources and designing system components to apply those scheduling algorithms in a highly dynamic, but also highly reliable manner. This can be particularly challenging in the context of NGSO systems, as designing such algorithms further involves accounting for satellite movement, constellation dynamics, and/or other technical concerns. Another such hurdle is that dynamically changing beam patterns can lead to interference concerns, and implementing reliable beam hopping can involve designing and implementing techniques for advanced coordination, beamforming, and/or other types of interference mitigation. Another such hurdle is that implementing effective beam hopping can involve accurately forecasting demand to inform beam hopping decisions, including designing in flexibility to respond to incorrect forecasts and/or other changes. Another such hurdle is that implementing beam hopping can involve designing satellites with flexible payload systems capable of rapid reconfiguration and designing ground stations (e.g., gateways) that can manage complex beam hopping communications protocols, schedules, etc.

Embodiments described herein apply beam hopping to the air interface of an iTNTN system, such as a system based around a 5G NR core network. Beam hopping approaches described herein seek to address several technical considerations, such as supporting a large number of cells with a small number of beams with low latency, low synchronization error, high adaptability, and high compatibility with both the NTN air interface and the underlying terrestrial core network. As such, embodiments of beam hopping approaches include features, such as low cycle times, low synchronization error, high granularity with short dwell time slots, and separate treatment of different air interface signal types (including traffic and control signals, acquisition signals, and positioning, navigation, and timing (PNT) signals).

For example, in the forward link, the 5G NR air interface can include several signals. PDSCH (Physical Downlink Shared Channel) is a channel that carries user data and some control information on the forward downlink. PDCCH (Physical Downlink Control Channel) is a channel that carries downlink control information (DCI) (e.g., resource allocation and scheduling decisions) to the UE. PBCH (Physical Broadcast Channel) is a channel that transmits system information necessary for the UE to access and demodulate further information from the network. Each of these channels can carry corresponding DM-RS (Demodulation Reference Signals) that provide channel estimation information to aid in demodulation of the transmitted data on the channel. A PSS (Primary Synchronization Signal) can be used by the UE to achieve frequency synchronization with its cell and to identify a portion of the cell's physical cell identifier. A SSS (Secondary Synchronization Signal) can aid the UE in completing the cell synchronization, including frame synchronization, by providing the remaining portion of the physical cell identifier. PT-RS (Phase Tracking Reference Signals) and/or CSI-RS (Channel State Information-Reference Signals) can also be included. PT-RS can be used to correct and compensate for phase noise in the signal and facilitate accurate phase demodulation, and CSI-RS can be used by the UE to measure the channel quality and facilitate network optimization of transmission parameters. PRS (Positioning Reference Signals) can be used by the UEs to estimate their geographical positions with high accuracy and otherwise to communicate position reference symbols used for the PNT (position, navigation and timing) system. The following table shows the described forward-link signals along with corresponding modulation scheme, forward error correction scheme, and signal type.

| PHY Channel/Signal | Modulation | FEC | Signal Type |
|---|---|---|---|
| PDSCH/DM-RS | QPSK (quadrature phase shift keying), 16 QAM (quadrature amplitude modulation), 64 QAM | LDPC (low-density parity check) BG (base graph) 1 and 2 | Communication |
| PDCCH/DM-RS | QPSK | Polar Code | Communication |
| PBCH/DM-RS | QPSK | Polar Code | System Access |
| PSS | m-sequence, BPSK | N/A | System Access |
| SSS | Gold-sequence, BPSK | N/A | System Access |
| PT-RS, CSI-RS | Gold-sequence, QPSK | N/A | Communication |
| PRS | Gold-sequence, QPSK | N/A | PNT |

In the return link, the 5G NR air interface can include additional signals. PUSCH (Physical Uplink Shared Channel) is a channel that can be used for uplink data transmissions from the UE to the network and can carry user data as well as control information. The PUCCH (Physical Uplink Control Channel) is a channel that can transmit control information from the UE to the network, such as scheduling requests, hybrid automatic repeat request (HARQ) acknowledgments, and channel state information (CSI). Both channels can carry DM-RS for channel estimation and for demodulating the received signals at the base station. The PUSCH can also carry PT-RS (Phase Tracking Reference Signals) which can help compensate for phase noise in the uplink transmission. PRACH (Physical Random Access Channel) is a channel used for initial access attempts from the UE to the network (e.g., when a device needs to establish a connection with the network, such as when it first powers on or moves out of an idle state). The PRACH can carry a PRACH preamble, which is a specific signal pattern sent to initiate the access procedure so that the network can identify the presence of a UE trying to connect and can assist in timing and power level estimation for subsequent communications with the UE. SRS (Sounding Reference Signals) are uplink reference signals used for measuring channel quality (e.g., uplink channel conditions) to facilitate optimizing uplink transmissions (e.g., modulation and coding schemes, power control, scheduling decisions, etc.). There is no PNT in the return direction. The following table shows the described return-link signals along with corresponding subcarrier modulation scheme, forward error correction scheme, and signal type.

| PHY Channel/Signal | Subcarrier Modulation | FEC | Signal Type |
|---|---|---|---|
| PUSCH/DM-RS/PT-RS | Pi/2-BPSK, QPSK, 16 QAM, 64 QAM/ Gold (Pi/2-BPSK) and ZC (Zadoff-Chu) sequence (Chirp) | LDPC BG 1 and 2 | Communication/ System Access |
| PUCCH/DM-RS | BPSK, QPSK/ ZC sequence, Chirp | Block, Polar code | Communication |
| PRACH Preamble | ZC sequence based, Chirp | N/A | System Access |
| SRS | ZC sequence based, Chirp | N/A | Communication |

FIGS. 4-7 illustrate beam hopping approaches according to embodiments described herein. The illustrative approaches assume a system in which satellites support 48 beams, including a single PNT beam and 47 traffic beams for communication and system access. Each traffic beam supports 7 respective cells, so that the 47 traffic beams support 329 total cells.

Figure 4:
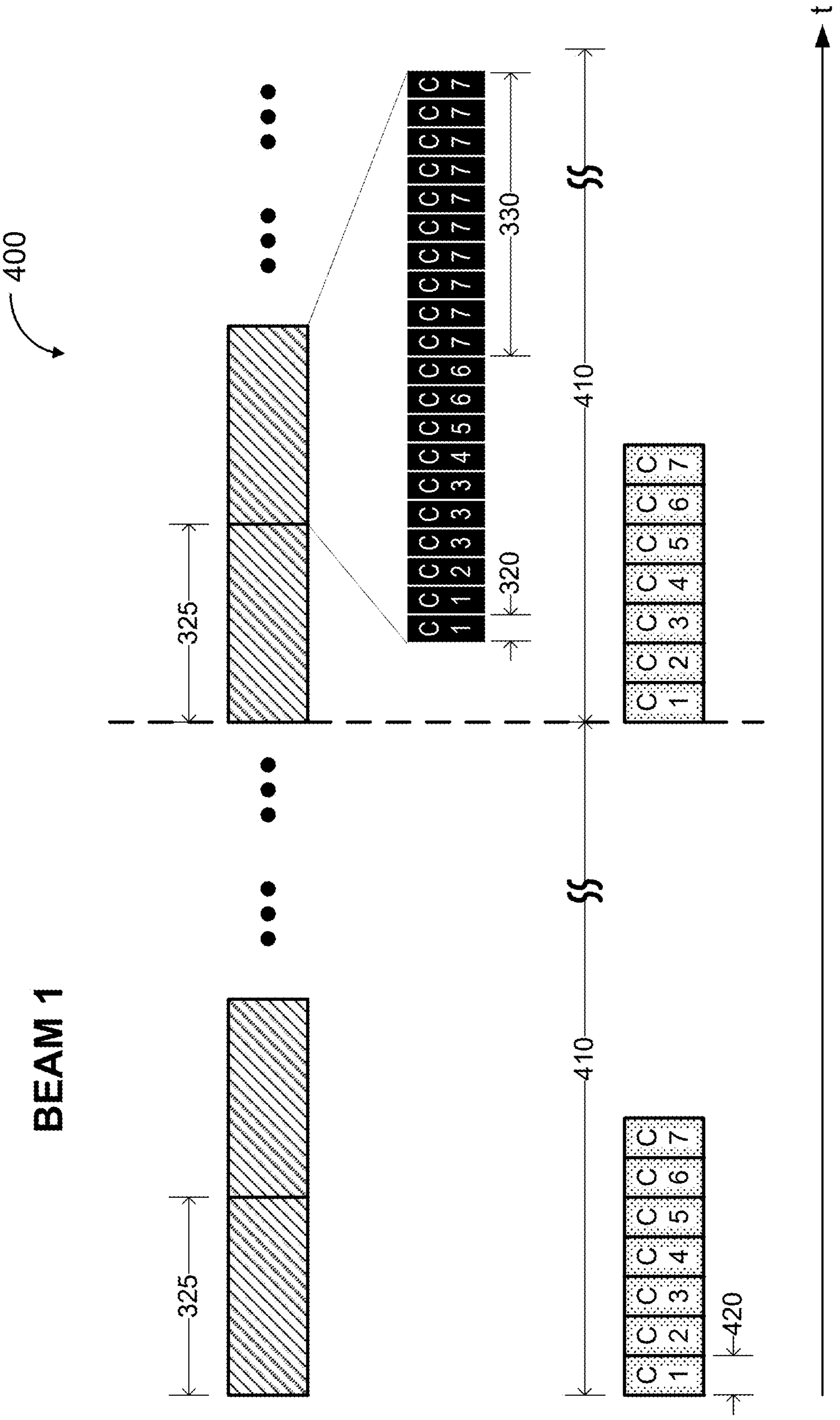
FIG. 4 shows an illustrative beam hopping sequence for a single traffic beam supporting 7 cells.

FIG. 4 shows an illustrative beam hopping sequence 400 for a single traffic beam supporting 7 cells. Descriptions above of beam hopping cycles refer to traffic beam hopping cycles. As described above, each traffic beam hopping cycle is divided into dwell time slots 320. In the illustrated sequence 400, each traffic beam hopping cycle is divided into 20 dwell time slots 320, such that the revisit time 325 (i.e., the total duration of each traffic beam hopping cycle) is 20 dwell time slots 320. For example, the revisit time 325 can be 5 ms, and each dwell time slot 320 can be 250 ρs, so that there are 20 dwell time slots 320 in each traffic beam hopping cycle. As illustrated, different beam dwell durations 330 can be allocated to different cells, thereby providing resource (e.g., bandwidth) allocation flexibility. For example, in the illustrated sequence 400, cell "C2" is shown as having a beam dwell duration 330 corresponding to a single dwell time slot 320 (e.g., 250 ρs), while cell "C7" is shown as having a beam dwell duration 330 corresponding to 10 dwell time slots 320 (e.g., 2.5 ms).

In addition to the traffic beam hopping cycles, the illustrated sequence 400 also includes acquisition beam hopping cycles. Each acquisition beam hopping cycle is divided into cell acquisition time slots 420. Each cell acquisition time slot 420 can be a time period allocated for ground terminals (e.g., UTs) to detect, synchronize with, and possibly initiate communication with the satellite. For example, during cell acquisition time slots 420 ground terminals can scan for signals from the satellite to identify the presence of a transmission beam, can synchronize timing and frequency with satellite transmissions, can receive system information from the satellite (e.g., satellite identification, beam scheduling information, access parameters, etc.), can establish user links, etc.

In some embodiments, each cell acquisition time slot 420 is a longer duration than that of the dwell time slots 320. For example, each cell acquisition time slot 420 can be 1 ms, so that each revisit time 325 of the traffic beam hopping cycle corresponds to five cell acquisition time slots 420. In such a case, with 7 cells to acquire, the acquisition can consume 1.4 traffic beam hopping cycles. The total acquisition cycle duration 410 of each acquisition beam hopping cycle can include acquisition of all 329 cells. For embodiments with a 1-ms cell acquisition time slot 420, the acquisition cycle duration 410 is 329 ms. In the illustrated sequence 400, for each beam, the cell acquisition time slots 420 consume 7:329 of the acquisition cycle duration 410, such that the acquisition channel overhead is only around 2.1 percent.

Figure 5:
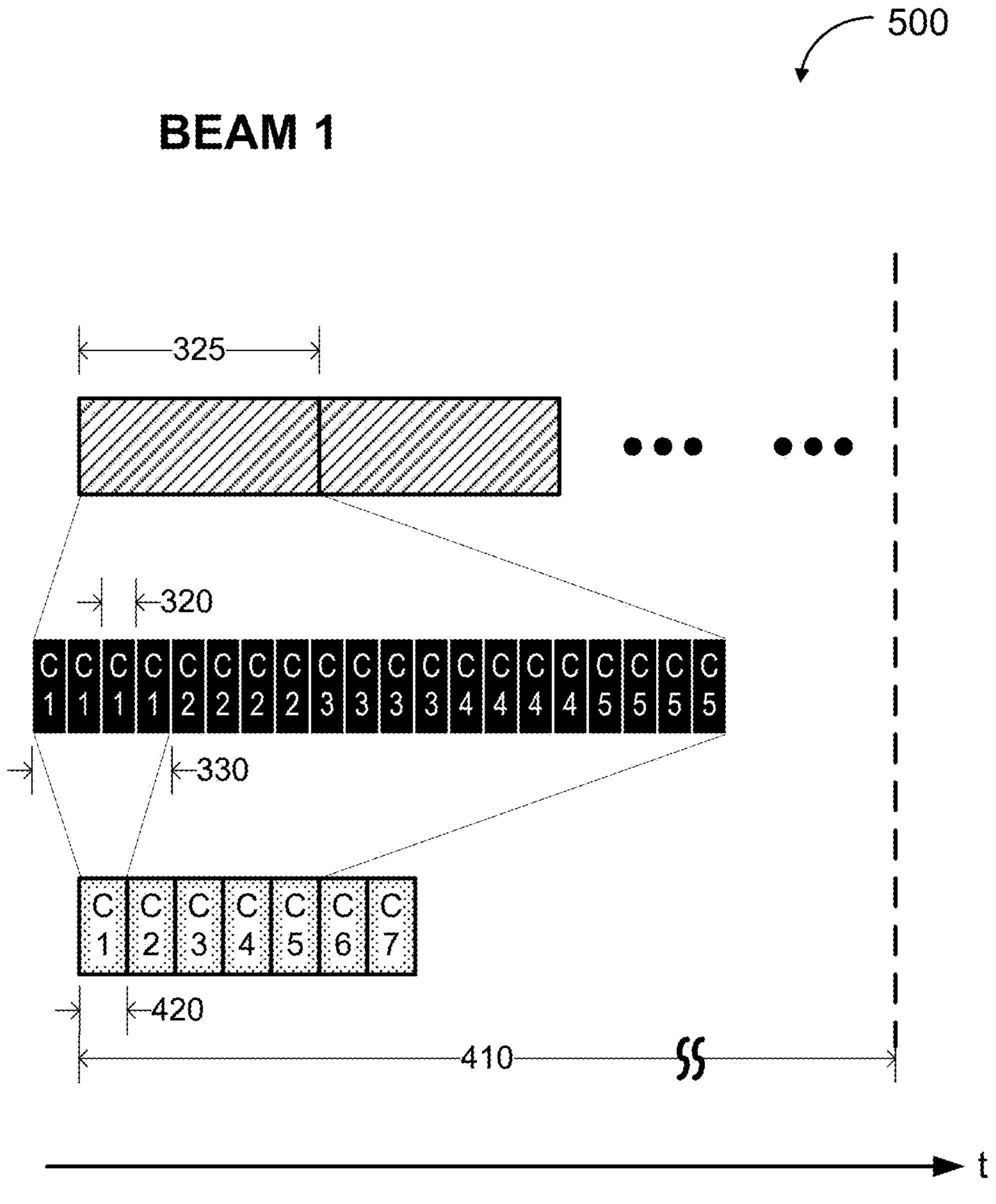
FIG. 5 shows another illustrative beam hopping sequence that is a variant of the sequence of FIG. 4.

FIG. 5 shows another illustrative beam hopping sequence 500 that is a variant of the sequence 400 of FIG. 4. As in FIG. 4, the sequence 500 includes traffic beam hopping cycles each with a revisit time 325 divided into 20 dwell time slots 320, and acquisition beam hopping cycles each with an acquisition cycle duration 410 divided into 329 cell acquisition time slots 420 (7 per beam over 47 beams). As illustrated in FIG. 5, embodiments can use sequential (back-to-back) dwell time slots 320 to coordinate beam dwell durations 330 to cell acquisition time slots 420. Sequential dwell time slots 320 can be uniformly distributed across 1.4 traffic beam hopping cycles to facilitate the 7 cell acquisition time slots 420 for the acquisition channel. For example, in an embodiment with a 1-ms cell acquisition time slot 420 and 250-μs dwell time slots 320, each cell acquisition time slot 420 is equivalent to four dwell time slots 320.

Figure 6:
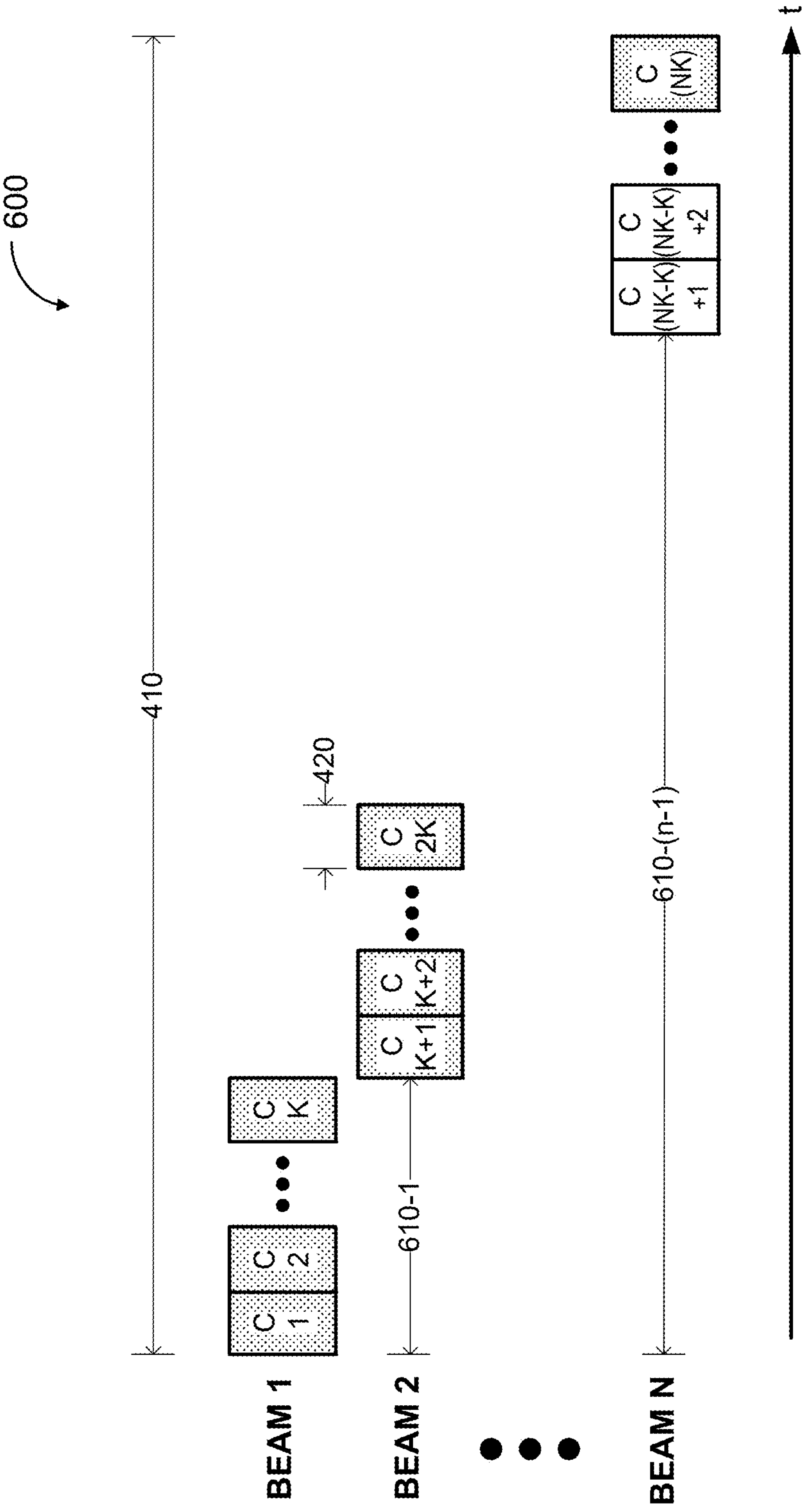
FIG. 6 shows an illustrative acquisition beam hopping sequence over N beams.

FIG. 6 shows an illustrative acquisition beam hopping sequence 600 over N beams. The sequence 600 can be a variant of the acquisition beam hopping portion of the sequence 400 of FIGS. 4 and/or 5. As illustrated, each of the beams is assigned (e.g., on average) to a respective K cells out of NK total cells. For example, Beam 1 is assigned to cells C1-CK, Beam 2 is assigned to cells C(K+1)-C(2K), and Beam N is assigned to cells C((NK—K)+1)—C(NK). The allocation of cells per beam may not be uniform, and the use of a single variable "K" is intended only for simplicity. For example, in a system of 100 cells and 20 beams, Beam 1 may be assigned to cells C1-C5 (5 cells), Beam 2 is assigned to cells C6-C11 (6 cells), and Beam 20 is assigned to cells C97-C100 (4 cells). As such, the total acquisition cycle duration 410 includes N*K cell acquisition time slots 420. In a system with 47 beams equally supporting 329 beams, K is 7, N is 47, and N*K is 329. For example, assuming a uniform assignment, Beam 1 is assigned to cells 1-7, Beam 2 is assigned to cells 8-14, and Beam N is assigned to cells 323 -329.

In the illustrated sequence 600, cell acquisition time slots 420 for each beam are staggered over the acquisition beam hopping cycle. For example, the cell acquisition time slots 420 for Beam 2 can begin upon the conclusion of the last cell acquisition time slot 420 for Beam 1, at a first offset time 610-1 after the start of the acquisition beam hopping cycle; and the cell acquisition time slots 420 for Beam N can begin upon the conclusion of the last cell acquisition time slot 420 for Beam N−1, at an (N−1)th offset time 610-($n$−1) after the start of the acquisition beam hopping cycle. In such implementations, while any one beam is supporting communications over acquisition channels for cell acquisition, the other N−1 beams are supporting communications over traffic and control channels. Such staggering can reduce concurrent signal power concentration at the satellite's high-power amplifier (HPA) for forward-direction communications. In the return direction, such staggering can reduce RACH hardware resource usage by reducing concurrent RACH access. For example, embodiments can share a single RACH hardware set across all beams (because their use is staggered), rather than having 47 RACH hardware sets (i.e., a dedicated one per beam). Such implementations can thus reduce RACH power and hardware by a factor of 47.

Figure 7:
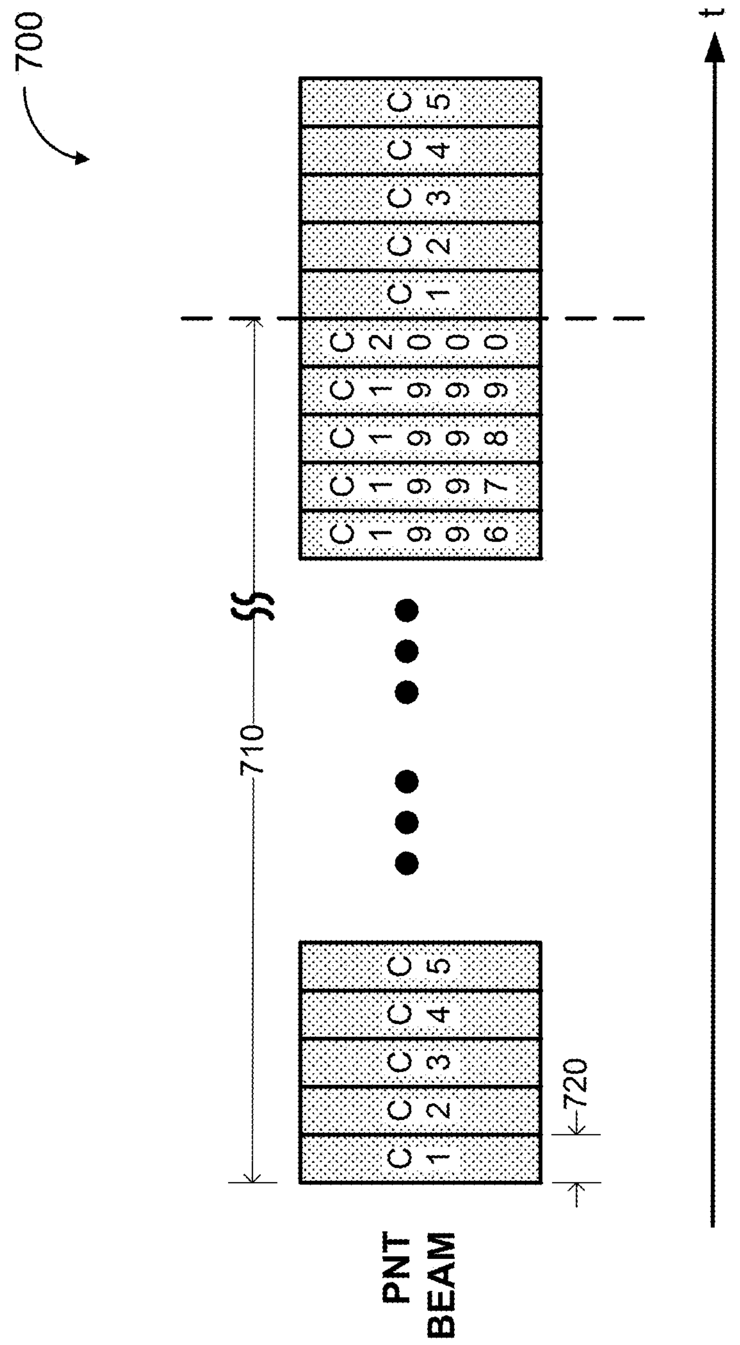
FIG. 7 shows an illustrative positioning, navigation, and timing (PNT) beam hopping sequence, according to embodiments described herein.

FIG. 7 shows an illustrative positioning, navigation, and timing (PNT) beam hopping sequence 700, according to embodiments described herein. As described above, embodiments can include a dedicated PNT beam, such as 1 of 48 beams dedicated to PNT signals. The sequence 700 can be used concurrently with any of the sequences of FIGS. 4-6. Accurately determining position and time for a particular UT can involve simultaneous visibility of the UT to multiple (e.g., at least 3 or 4) satellites. For example, the multiple simultaneous visibility can facilitate trilateration using time signals from the multiple satellites and known respective locations of those satellites. Ensuring simultaneous visibility to the multiple satellites can involve ensuring that the PNT beam has a low minimum elevation angle (MEA). A lower MEA effectively expands the coverage area of the PNT beam from each satellite, making it more likely for UTs to have simultaneous line-of-sight with a minimum number of satellites for enabling PNT over a wide geographic area.

In some embodiments, the MEA of the PNT beam is lower than that of the traffic and control beams. To reliably communicate traffic and control signals, UTs can typically establish a link with only a single satellite at a time. This can allow for a more focused beam design, where beams from different satellites can overlap, and each satellite can manage fewer beams. For example, since each satellite handles fewer beams, the system can use more directed, higher-gain antennas for those beams, which can improve the efficiency and quality of the communication links.

Because of the different operational requirements of PNT beams as compared to traffic and control beams, the same geographic area can be covered by a different number of cells from the perspective of the different types of beams. From the perspective of traffic and control beams, cells are defined by the coverage area of a satellite beam where direct communication is established between the satellite and ground terminals, which can be a geographic area where user terminals can successfully communicate with a single satellite at a time. Such cells can be larger and can overlap, allowing for redundancy and ensuring continuous service as satellites move relative to the Earth's surface. From the perspective of the PNT beam, cells may be defined by geographic areas from which UTs can have simultaneous line-of-sight to multiple satellites. Thus, such cells can be smaller and more granular, and what may be considered a single cell for traffic and control purposes may be subdivided into numerous smaller cells for PNT purposes.

For example, different cell sizes can be used for traffic/control communications and for PNT communications. Embodiments are configured so that the satellite covers more Earth surface area for PNT with lower MEA, as compared to traffic/control. This can allow a UT in a given cell to see multiple satellites at the same time. Accurate position and timing determination can involve the UT receiving signals from least three or four satellite. Use of lower MEA (for a larger satellite coverage) can increase the number of cells (e.g., 2000 cells) that each satellite addresses for PNT purposes, as compared to the number of cells (e.g., 329 cells) that the satellite address for traffic/control purposes. In essence, the satellite footprint for PNT can be larger than that of traffic/control. Challenges in PNT reception at a lower MEA (e.g., a lower SNR and possibly non-line of sight) can be mitigated by allocating higher satellite power for PNT signals and by the use of advanced signal processing at UT receivers.

Some embodiments described herein assume that approximately the geographic area covered by 329 cells for traffic and control purposes is subdivided into 2,000 cells for PNT purposes. This is illustrated in FIG. 7 as cells "C1" through "C2000" (i.e., cell "C1" in this context is not geographically coextensive with cell "C1" in the context of FIGS. 4-6). The illustrative sequence 700 shows a PNT beam hopping cycle with a PNT cycle duration 710 divided into 2,000 PNT time slots 720. For example, the PNT cycle duration 710 is one second, such that each PNT time slot 720 is 500 his. In the case of a single dedicated PNT beam out of 48 total beams, the PNT beam overhead is 1:48, or approximately 2.1 percent (approximately the same as the cell acquisition overhead in each beam).

Combining the sequence of FIG. 7 with any of those of FIGS. 4-6 demonstrates efficient multiplexing of the traffic and PNT channels enabled by embodiments herein. As further demonstrated, this multiplexing also yields low PNT beam overhead (around 2.1%) with low control channel overhead (also around 2.1%). The following exemplary parameter summary table reflects embodiments described above.

embodiments, longer acquisition time slots can be used to increase the robustness of the acquisition channel by allowing repetition or with more parity bits.

Figure 8:
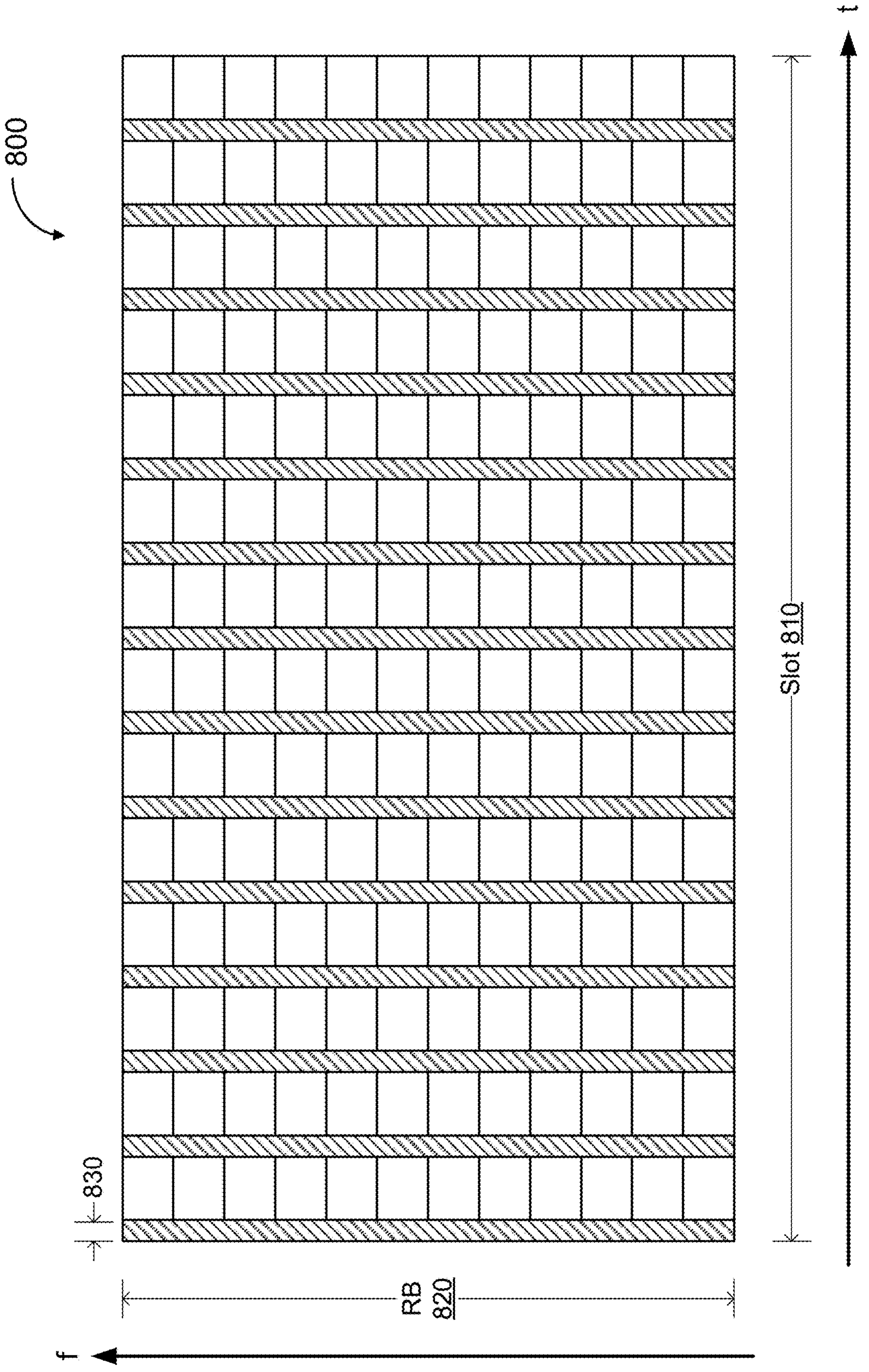
FIG. 8 shows an illustrative representation of a frame structure that can be used with core network protocols, such as 5G NR.

In 5G NR, communications use frame structures that are divided into slots, each occupying a slot duration in the frame structure (i.e., slots re the fundamental unit of time in the frame structure). For example, FIG. 8 shows an illustrative representation of a frame structure 800 that can be used with core network protocols, such as 5G NR. The frame structure 800 is represented as having a time dimension and a frequency dimension. The time dimension is defined by a slot 810 divided into symbols (e.g., orthogonal frequency division multiplexing (OFDM) symbols). The slot has a slot duration. In the illustrated frame structure 800, the slot 810 includes 14 OFDM symbols. The frequency dimension is defined as a resource block (RB) 820 divided into subcarriers. For example, the frame structure 800 has an RB 820 with 12 subcarriers. Each time slot (each OFDM symbol) can also be prefaced by (e.g., include) a cyclic prefix (CP) 830 of a defined CP duration.

The slot and CP durations can vary depending on the numerology (e.g., subcarrier spacing, SCS) used in the network configuration. An example terrestrial core network has a radio frame duration of 10 ms and a sub-frame duration

| | Communications | | System Access / PNT | |
|---|---|---|---|---|
| | Forward Link | Return Link | Forward Link (Acquisition/PNT) | Return Link (System Access) |
| Applicable Physical Channels | PDSCH, PDCCH | PUSCH, PUCCH | SBS (PSS/SSS/PBCH (MIB), PDCCH/PDSCH (SIB1) / PRS | PRACH, PUSCH |
| Dwell Resolution | 250 us | 250 us | 1 ms (acquisition) / 500 us (PNT) | 1 ms |
| Hopping Cycle Duration | 5 ms | 5 ms | 329 ms (acquisition)/ 1 second (PNT) | 329 ms |
| Max. No of Hops per hopping cycle | 20 | 20 | 329 (acquisition)/ 2000 (PNT) | 329 |

The exemplary parameter summary table reflects parameter values for some embodiments described herein. Alternative embodiments are possible by reconfiguring the parameter values to account for trade-offs between latency, overhead, and complexity. Some alternative embodiments seek to minimize access delays while keeping overhead ratios the same. Such embodiments can keep the same communication channel beam hopping parameters as in the exemplary parameter summary table but can use shorter acquisition time slots and acquisition cycle durations. One such embodiment uses acquisition time slots of 500 μs and an acquisition cycle duration of 160 μs. Another such embodiment uses acquisition time slots of 250 μs and an acquisition cycle duration of 80 μs. In both of these alternative embodiments, the acquisition overhead remains at approximately 2.1 percent. Other alternative embodiments seek to minimize access delays in exchange for a higher overhead ratio. Such embodiments can keep the same communication channel beam hopping parameters as in the exemplary parameter summary table with the same acquisition time slots, but can use shorter acquisition cycle durations. One such embodiment uses acquisition time slots of 1 ms and an acquisition cycle duration of 160 μs. Another such embodiment uses acquisition time slots of 1 ms and an acquisition cycle duration of 80 μs. These alternative embodiments yield acquisition overheads of approximately 4.2 percent and 8.4 percent, respectively. In other alternative of 1 ms. As the SCS increases, the slot duration and CP duration tend to decrease. For example, an SCS of 15 KHz has a slot duration of 1 ms and a CP duration of 4.7 microseconds (μs), an SCS of 30 KHz has a slot duration of 0.5 ms and a CP duration of 2.3 μs, an SCS of 60 KHz has a slot duration of 250 μs and a CP duration of 1.2 μs, an SCS of 120 KHz has a slot duration of 125 μs and a CP duration of 0.6 μs, and an SCS of 240 KHz has a slot duration of 62.5 μs and a CP duration of 0.3 μs. Because of these different durations, each numerology effectively has a different number of slots in each subframe and a different useful symbol duration. For example, an SCS of 30 KHz has 2 slots per subframe (i.e., two 0.5-ms slots can fit in the 1-ms subframe); and with 14 symbols per slot, each symbol has a useful symbol duration of approximately 33.3 μs (i.e., each can use 1/14 of the 0.5-ms slot less the CP duration). In such an example terrestrial core network (e.g., in 5G NR), user scheduling is performed at a slot granularity (or mini-slot granularity, corresponding to a multiple of symbols). This multiple "numerology" of 5G NR allows the network to flexibly and efficiently support a wide range of services and deployment scenarios.

In some embodiments, dwell time slots are defined to fit with one or more corresponding 5G NR numerologies. One embodiment is configured to be compatible with a 5G NR numerology using a forward-link SCS of 120 KHz and a return-link SCS of 60 KHz, so that there is common slot boundary at 250 μs. In such an embodiment, each dwell time slot is 250 μs, thereby consuming two 5G NR slots in the forward direction and one 5G NR slot in the return direction. Each cycle time can be 5 ms, so that each beam hopping cycle is a pattern of 20 dwell time slots (i.e., 5 ms/250 μs=20), each assigned to a beam.

As noted above, systems can use OFDM, which splits a data signal across multiple closely spaced subcarriers to send bits in parallel, thereby increasing efficiency of wide-band digital communications particularly in environments prone to multipath interference. For example, in a satellite communication system, Doppler shifts, signal propagation delays, and other factors can lead to timing offsets, phase errors, and other concerns, which can result in inter-symbol interference (ISI). OFDM schemes can avoid (or mitigate) ISI by inserting a cyclic prefix (CP), which is typically a copy of the end of an OFDM symbol appended to the beginning of that symbol. The CP has a duration longer than the expected maximum delay spread of the channel (i.e., the time difference between the arrival of the fastest and slowest multipath components), such that the CP duration effectively provides a buffer period between symbols. Even if symbols arrive at different times, the information-bearing part of the symbols can be demodulated and decoded correctly at the receiver because the CP duration avoids ISI from adjacent symbols.

The system (e.g. GNOC) can define one or more CP durations. Embodiments of the satellite communication system can be designed to ensure that synchronization-based timing misalignments stay within a minimum CP duration used by the core network, so that receivers can correctly align OFDM symbols for demodulation, avoid data loss, and reduce the impact of ISI. For example, 5G NR specifications define different CP durations for different numerologies. As described above, some embodiments assume a return-link SCS of 60 KHz, which can correspond to a CP duration of approximately 1.2 microseconds. In such embodiments, the system can be designed to keep the synchronization error below one microsecond.

Referring back to FIGS. 4-7, it has been demonstrated that embodiments support efficient multiplexing of traffic, control, and PNT channels. For example, the sequences illustrated in those figures show that traffic, acquisition, and PNT slots can be defined to have durations that are multiples of each other. Extending that to the context of frame structures, such as the frame structure 800 of FIG. 8, embodiments can synchronize all frame boundaries and frequencies to those of the traffic (communication) beams. Thus, in some embodiments, all communication, acquisition, and PNT channels have the same downlink OFDM grid structure.

To date, 5G NR specifications support the following three operating frequency ranges (e.g., as defined in Technical Specification 38.104, version 18.50):

| | |
|---|---|
| FR1 | 410 MHz-7.125 GHz |
| FR2-1 | 24.25 GHz-52.6 GHz |
| FR2-2 | 52.6 GHz-71 GHz |

The following three tables show transmission channel bandwidths for FR1, FR2-1, and FR2-2, respectively, as supported by present 5G NR specifications (channel bandwidths are shown in MHz, and SCSs are shown in kHz):

| | Transmission Channel Bandwidth (FR1) | | | | | | | |
|---|---|---|---|---|---|---|---|---|
| SCS | 3 | 5 | 10 | 15 | 20 | 25 | 30 | 35 |
| 15 | 15 | 25 | 52 | 79 | 106 | 133 | 160 | 188 |
| 30 | — | 11 | 24 | 38 | 51 | 65 | 78 | 92 |
| 60 | — | — | — | 11 | 18 | 24 | 31 | 38 |

| | Transmission Channel Bandwidth (FR1) (Cont.) | | | | | | | |
|---|---|---|---|---|---|---|---|---|
| SCS | 40 | 45 | 50 | 60 | 70 | 80 | 90 | 100 |
| 15 | 216 | 242 | 270 | — | — | — | — | — |
| 30 | 106 | 119 | 133 | 162 | 189 | 217 | 245 | 273 |
| 60 | 44 | 51 | 58 | 65 | 79 | 93 | 107 | 121 |

| | Transmission Channel Bandwidth (FR2-1) | | | |
|---|---|---|---|---|
| SCS | 50 | 100 | 200 | 400 |
| 60 | 66 | 132 | 264 | — |
| 120 | 32 | 66 | 132 | 264 |

| | Transmission Channel Bandwidth (FR2-2) | | | | |
|---|---|---|---|---|---|
| SCS | 100 | 400 | 800 | 1600 | 2000 |
| 120 | 66 | 264 | — | — | — |
| 480 | — | 66 | 124 | 248 | — |
| 960 | — | 33 | 62 | 124 | 148 |

The above tables demonstrates that the present 5G NR specification does not presently include the frequency range between 7.125 GHz and 24.25 GHz. Further, the above tables demonstrate that the 5G NR specification presently supports limited transmission channel bandwidths. For example, some satellite communication systems are configured to operate in the Ku-band, which is approximately 10 GHz-14 GHz, and to operate with a channel bandwidth of 250 MHz. Neither is directly supported. Indeed, one approach is to support 250 MHz channel bandwidth using carrier aggregation of supported 200 MHz and 50 MHz channel bandwidths (e.g., in FR2-1). However, such carrier aggregation tends to complicate implementation as well as operation and still does not support operation in Ku-band.

Figure 9:
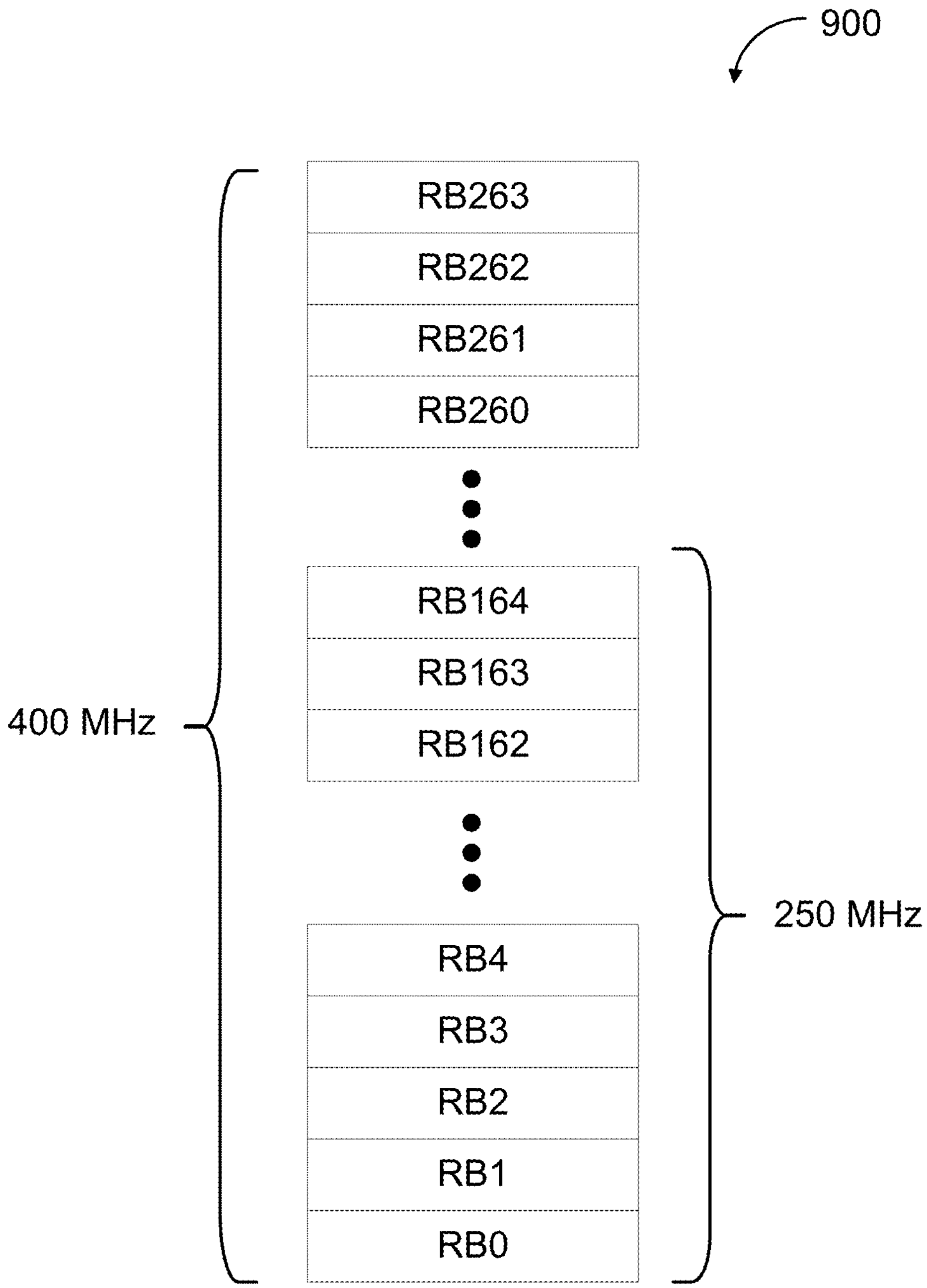
FIG. 9 shows a representation of an illustrative transmission channel that supports operation in Ku-band with a pseudo channel bandwidth of 250 MHz, according to some embodiments described herein.

FIG. 9 shows a representation of an illustrative transmission channel 900 that supports operation in Ku-band with a pseudo channel bandwidth of 250 MHz, according to some embodiments described herein. The illustrated approach does not rely on carrier aggregation. Embodiments can begin by selecting the SCS with the smallest supported transmission channel bandwidth that is greater than or equal to the desired 250 MHz. According to the tables above, both FR2-1 and FR2-2 support 400-MHz channels with a 120-kHz SCS. Instead of using the full 400 MHz (which includes 264 RBs), embodiments can use a contiguous 250-MHz spectrum chunk with a smaller number of RBs to obtain a pseudo channel bandwidth. As illustrated, 165 RBs can be used, such that 165 RBs times 12 subcarriers per RB times 120 kHz per subcarriers equals 237.6 MHz. The remaining 12.4 MHz out of 250 MHz can serve as guard bands.

In such an approach, transceivers (i.e., the satellite transmitters and receivers) can be configured as if the channel bandwidth is 400 MHz, but the channel can nonetheless operate with a bandwidth of 250 MHz. For example, a 400 MHz channel with an SCS of 120 kHz can use a 4K IFFT/FFT (inverse fast-Fourier transform/fast-Fourier transform) for OFDM signal generation and reception. Embodiments modify the configuration to produce the 250 MHz pseudo-bandwidth by using only a subset of the 4K IFFT inputs and 4K FFT outputs. At the transmitter side, zeros can be assigned for unused frequency bins corresponding to unused ones of the 4K IFFT inputs. At the receiver side, either unused frequency bins from the 4K FFT outputs can be discarded, or unused frequency bins from the 4K FFT outputs can be used for adjacent channel interference cancellation schemes.

Figure 10:
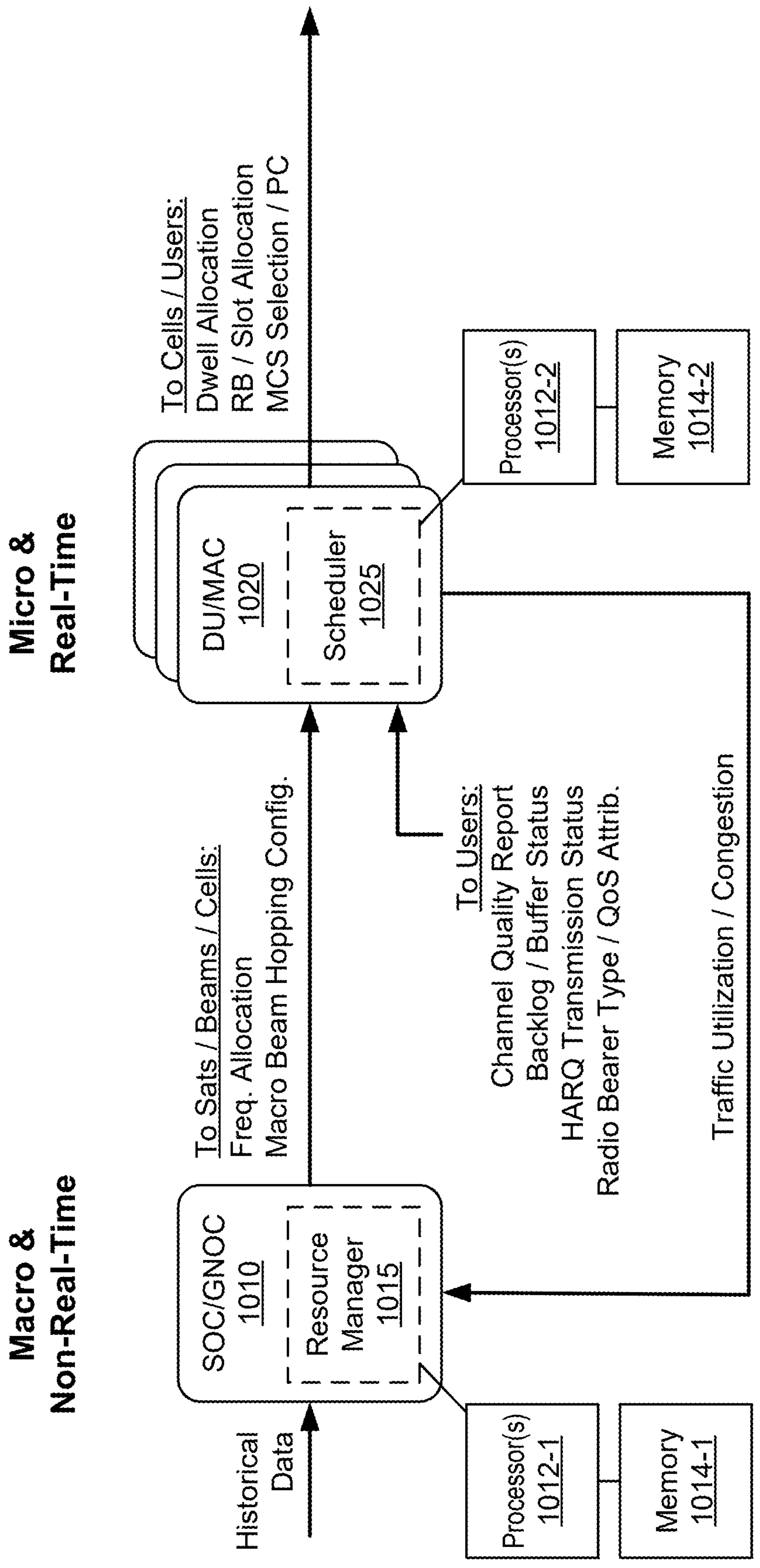
FIG. 10 shows an illustrative distribution of beam hopping features between an illustrative global network operations center (GNOC) and radio access network (RAN) distributed units (DUs).

The beam hopping features described above can be performed using any feasible iTNTN architecture, such as those described above with reference to FIGS. 1-2C. Such architectures include at least a GNOC (or SOC, or the like) and DUs for implementing certain MAC features. FIG. 10 shows an illustrative distribution of beam hopping features between an illustrative global network operations center (GNOC) 1010 and radio access network (RAN) distributed units (DUs) 1020. As described in FIGS. 2A-2C, the DUs 1020 can be implemented in the SRAN or in the satellites. As illustrated, the GNOC 1010 can include a resource manager 1015, and each DU 1020 (of some or all of the DUs 1020) includes a scheduler 1025.

Embodiments of the resource manager 1015 in the GNOC 1010 can generally be responsible for macro-level and non-real-time features supporting beam hopping approaches described herein. For example, the resource manager 1015 can allocate frequency resources and macro-level beam hopping configuration parameters to satellites, beams, and/or cells. The macro-level beam hopping configuration parameters include beam hopping cycle durations, dwell resolutions, and other such parameters. As illustrated, decisions on resource allocations and macro beam hopping configuration parameters can be based on projected traffic based on historical data, current traffic usage, and traffic utilization feedback from the DUs 1020. In some implementations, AI or ML algorithm can be used to estimate projected traffic.

Embodiments of the scheduler 1025 in each DU 1020 can generally be responsible for micro-level and real-time features supporting beam hopping approaches described herein. For example, embodiments can dynamically determine dwell durations for cells depending, in each hopping cycle, on instantaneous traffic demand and channel conditions and on available frequency resources. For users in cells, embodiments can allocate slots or mini-slots with an appropriate number of RBs, selected MCS (modulation and coding scheme), power level, etc. These and/or other decisions can be made jointly using channel quality and backlog (buffer status) reports from users, HARQ retransmission status, and/or other suitable information. The scheduler 1025 can also account for QoS attributes (e.g., guaranteed bit rate (GBR) versus non-GBR) of user radio bearers. As noted above, the scheduler 1025 can also provide feedback (e.g., congestion, traffic utilization, etc.) to the resource manager 1015 of the GNOC 1010.

Components of the communication systems, such as components of the SRAN and the SOC/GNOC 1010 can be implemented by computational systems. For example, each of the resource manager 1015 and the scheduler 1025 can be implemented by a corresponding computational system and/or by corresponding resources of a computational environment. As illustrated, each computational environment can include one or more processors 1012 and non-transitory, processor-readable memory 1014. Though not explicitly shown, the computational environments can further include any additional computational hardware, such as one or more input/output (I/O) devices, a communications subsystem, etc. The various hardware elements can be electrically coupled by a bus and/or via any other suitable connection. The processors 1012 can include, without limitation, one or more general-purpose processors and/or special-purpose processors. The memory 1014 can include any feasible non-transitory storage devices, such as local and/or network accessible storage, disk drives, drive arrays, optical storage devices, solid-state storage devices, etc. The memory 1014 can additionally include other storage devices, such as transitory storage devices.

The non-transitory, processor-readable memory 1014 can include a working memory, an operating system, device drivers, executable libraries, and/or other code and/or other components to support storing and executing processor-readable instructions. The non-transitory, processor-readable memory 1014 can be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods. In some embodiments, the operating system and working memory are used in conjunction with the one or more processors 1012-2 of the DU 1020 to implement the scheduler 1025; and/or the operating system and working memory are used in conjunction with the one or more processors 1012-1 of the SOC/GNOC 1010 to implement the resource manager 1015.

A set of these instructions and/or codes can be stored on a non-transitory computer-readable storage medium (i.e., memory 1014) and can take the form of executable code, which is executable by the processor(s) 1012. Alternatively, the instructions are stored as source and/or installable code, which, upon compilation and/or installation on the computational system (e.g., using any of a variety of generally available compilers, installation programs, compression/decompression utilities, etc.), then take the form of executable code. Execution of the instructions causes the one or more processors 1012 to perform steps in accordance with various embodiments of the invention. For example, some or all of the procedures of methods described herein are performed by the processor(s) 1012 executing one or more sequences of one or more instructions contained in the memory 1014.

Figure 11:
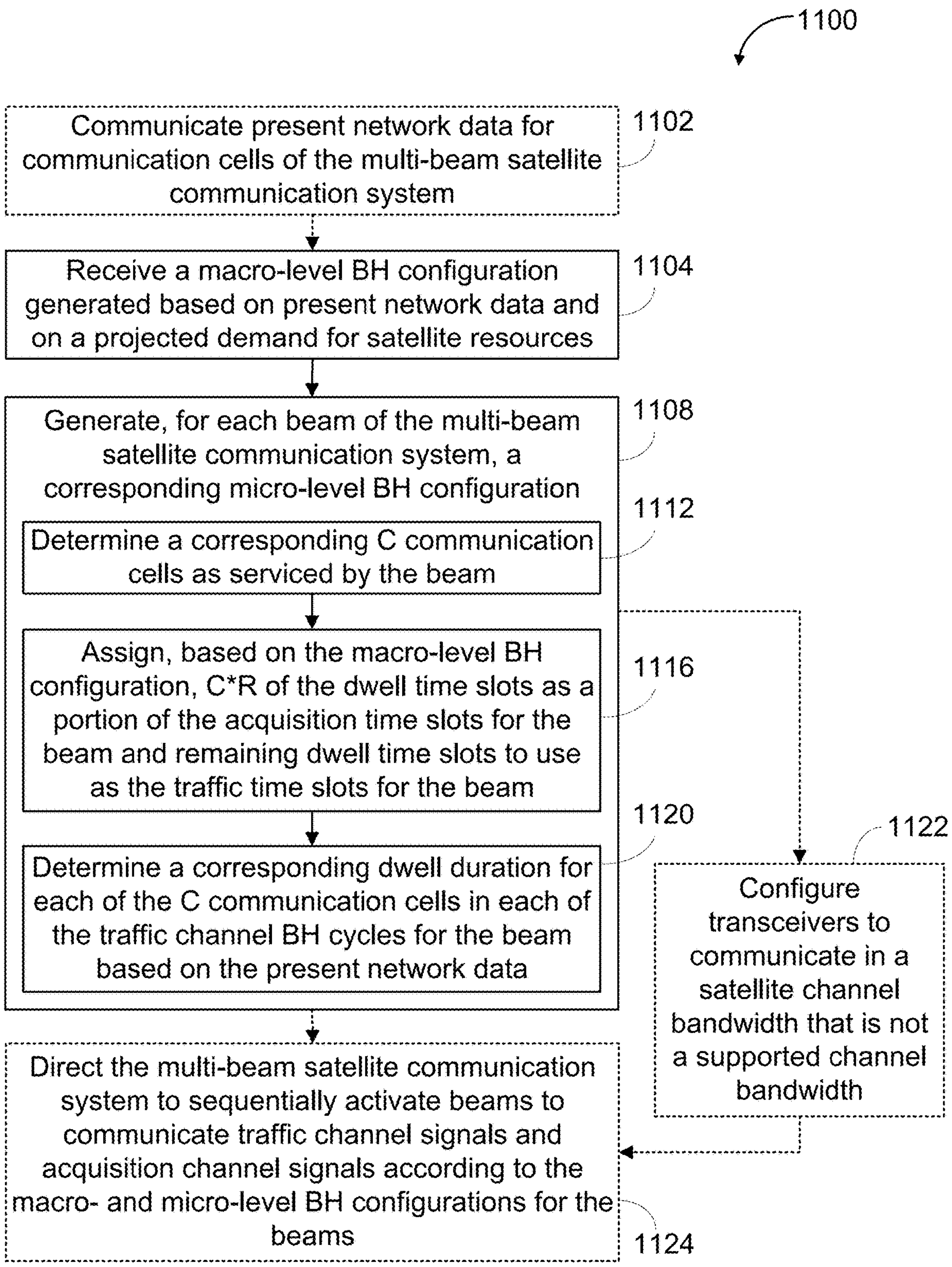
FIG. 11 illustrates a flow diagram of an illustrative method for beam hopping in an integrated terrestrial-non-terrestrial network (iTNTN) that integrates a multi-beam satellite communication system with a satellite radio access network (SRAN), according to embodiments described herein.

FIG. 11 shows a flow diagram of an illustrative method 1100 for beam hopping in an integrated terrestrial-non-terrestrial network (iTNTN) that integrates a multi-beam satellite communication system with a satellite radio access network (SRAN), according to embodiments described herein. Embodiments of the method 1100 begin at stage 1104 by receiving (e.g., by the SRAN from an operations center, such as a NOC, GNOC, SOC, etc.) a macro-level beam hopping (BH) configuration generated based on present network data and on a projected demand for satellite resources. As described herein, the macro-level BH configuration defines at least a traffic cycle duration and a traffic dwell resolution for a traffic channel BH cycle and an acquisition cycle duration and an acquisition dwell resolution for an acquisition channel BH cycle.

The traffic dwell resolution defines a quantity X of traffic time slots of duration T in each traffic channel BH cycle. The acquisition dwell resolution defines a quantity Y of acquisition time slots of duration S in each acquisition channel BH cycle. The acquisition time slot duration is a positive multiple of the traffic time slot duration (i.e., S=T*R). R, X, and Y are all positive integers, and S and T are positive numbers that may or may not be integers. In some embodiments, X=20, T=250 μs, Y=329, S=1 ms, and R=4.

In some embodiments, the method 1100 begins prior to stage 1104, at stage 1102, by communicating, by the SRAN to the operations center, the present network data for communication cells of the multi-beam satellite communication system. As described herein, the present network data indicates present network resource supply and demand. In such embodiments, the receiving at stage 1104 can be based at least in part on the communicating.

In some embodiments, the SRAN is configured to communicate according to terrestrial (e.g., 5G) waveform numerologies that define supported subcarrier spacings and associated supported time slot durations. In such embodiments, the macro-level beam hopping (BH) configuration can be generated in connection with stage 1104 so that T is a multiple of one of the supported time slot durations. For example, the traffic dwell resolution of the macro-level BH configuration is generated to define the quantity X of traffic time slots of duration T in each traffic channel BH cycle so that T is a multiple of one of the supported time slot durations. In some such embodiments, the terrestrial waveform numerologies further associate a nominal cyclic prefix (CP) duration for each supported time slot duration, and the multi-beam satellite communication system is configured to operate within a timing synchronization error including a beam switching time. In such embodiments, the macro-level beam hopping (BH) configuration can be generated in connection with stage 1104 so that T is a positive multiple of one of the supported time slot durations associated with a nominal CP duration that is larger than the timing synchronization error. For example, for a 0.5-μs timing synchronization error, the nominal CP duration can be approximately 0.6 μs, 1.2 μs, etc. (corresponding in 5G NR numerologies to SCSs of 120 kHz and 60 kHz, respectively).

At stage 1108, embodiments can generate (e.g., by the SRAN), for each beam of the multi-beam satellite communication system, a corresponding micro-level BH configuration having at least Y*R dwell time slots of duration T. The generating at stage 1108 can include stages 1112-1120. At stage 1112, embodiments can determine a corresponding C communication cells as serviced by the beam (C is a positive integer). For example, each beam can service 7 cells (C=7). As noted above, in some embodiments, the allocation of cells to beams is uniform (e.g., C=7 for all beams); while the allocation of cells to beams is non-uniform in other embodiments (e.g., C=7 on average for all beams, but not necessarily for any one beam). For example, for N beams, the number of cells for beam j can be denoted as C(j), so that $$\sum_{j=1}^{N} C_j = Y.$$

At stage 1116, embodiments can assign, based on the macro-level BH configuration, C*R of the dwell time slots as a portion of the acquisition time slots for the beam and (Y−C)*R of the dwell time slots (i.e., the remaining dwell time slots) to use as the traffic time slots for the beam, thereby yielding (Y−C)*R/X traffic channel BH cycles for the beam. For example, using the quantities in the preceding paragraph and C=7, there would be 329*4=1,316 dwell time slots in each cycle of the micro-level BH configuration, including 7*4=28 dwell time slots assigned for cell acquisition signals and a remaining portion of the dwell time slots assigned for traffic and control signals. In this example, the remaining portion is at least (329-7)*4=1,288, which yields 64.4 (i.e., 1,288/20) traffic channel BH cycles. Some embodiments can expand the micro-level BH configuration to a total number of dwell time slots that yields an even number of traffic channel BH cycles. At stage 1120, embodiments can determine a corresponding dwell duration for each of the C communication cells in each of the traffic channel BH cycles for the beam based on the present network data. For example, cells with higher present traffic can be assigned a longer dwell duration corresponding to a larger portion of the dwell time slots assigned for traffic and control signals in each traffic channel BH cycles.

In some implementations, a given beam can be dedicated for use as either an acquisition beam or a traffic/control beam. In other implementations, acquisition and traffic/control channels can be multiplexed onto a same beam (i.e., the beam is shared by both types of traffic). In one implementation, a beam can carry both acquisition and traffic/control channels simultaneously using different frequencies (e.g., different RB locations without overlap), thereby using the beam to address both acquisition and traffic/control for a given cell. For example, in such an implementation, the number of traffic/control beam hopping cycles can still be 65.8 (1316/20).

In some embodiments, at stage 1124, the method 1100 can direct (e.g., by the SRAN) the multi-beam satellite communication system to sequentially activate beams to communicate traffic channel signals and acquisition channel signals according to the micro-level BH configurations for the beams (e.g., and thereby also according to the macro-level BH configurations).

As described herein, embodiments of the multi-beam satellite communication system can produce the “beams” referenced in stages of the method 1100 as N traffic and control (TnC) beams (N is a positive integer). The multi-beam satellite communication system can further support one positioning, navigation, and timing (PNT) beam. In some embodiments, the multi-beam satellite communication system has a geographic coverage area corresponding to Y communication cells and P PNT cells, wherein P is an integer greater than Y. For example, a geographic coverage area of 329 cells is defined for TnC, and a wider geographic area of 2000 cells is defined for PNT (i.e., Y=329 and P=2,000). In some such embodiments, generating the macro-level BH configuration in connection with stage 1104 can further include defining a PNT channel BH cycle for the PNT beam as having P PNT time slots distributed over a PNT cycle duration. The PNT cycle duration can be different from the acquisition cycle duration. For example, each PNT time slot can be 500 μs, such that 2,000 PNT time slots form a 1-second PNT channel BH cycle. As described herein, the overlaid traffic channel, acquisition channel, and PNT channel BH cycles enables efficient multiplexing of those signals.

In some embodiments, the N TnC beams service Y communication cells, such that Y/N=C. For example, each of the Y acquisition time slots is used to acquire a respective one of the Y communication cells serviced by the N TnC beams. In some such embodiments, the assigning of the C*R of the dwell time slots as the acquisition time slots (as part of stage 1116) includes staggering assigning the dwell times slots for each TnC beam to avoid overlapping with the acquisition time slots for any other of the TnC beams. In such embodiments, a single instance of acquisition (e.g., RACH) hardware can be shared by all beams. Alternatively, the acquisition time slots can be partially staggered, so that there is some overlap. For example, pairs of beams (e.g., or three at a time, four at a time, etc.) can concurrently perform acquisition by using overlapping acquisition time slots, which can reduce the acquisition cycle duration at the expense of increased acquisition resources (e.g., more instances of acquisition hardware using more power, etc.).

In some embodiments, the SRAN is configured to communicate according to terrestrial waveform numerologies that define supported channel bandwidths, each having an associated supported subcarrier spacing. In some such embodiments, at stage 1122, the method 1100 can configure transceivers of the multi-beam satellite communication system to communicate in a satellite channel bandwidth that is not one of the supported channel bandwidths. Such configuration can involve: identifying one of the supported channel bandwidths as the lowest of the supported channel bandwidths that is greater than or equal to the satellite channel bandwidth; identifying the supported subcarrier spacing associated with the identified one of the supported channel bandwidths; computing a largest resource block (RB) quantity, such that a product of the RB quantity, a predefined number of subcarriers per RB, and the identified supported subcarrier spacing yields a channel pseudo-bandwidth that is closest to the satellite channel bandwidth without exceeding the satellite channel bandwidth; and reserving any remainder between the satellite channel bandwidth and the channel pseudo-bandwidth as a guard band.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for beam hopping in an integrated terrestrial-non-terrestrial network (iTNTN) that integrates a multi-beam satellite communication system with a satellite radio access network (SRAN), the method comprising:

receiving, by the SRAN from an operations center, a macro-level beam hopping (BH) configuration generated based on present network data and on a projected demand for satellite resources, the macro-level BH configuration defining at least a traffic cycle duration and a traffic dwell resolution for a traffic channel BH cycle, and an acquisition cycle duration and an acquisition dwell resolution for an acquisition channel BH cycle, such that the traffic dwell resolution defines a quantity X of traffic time slots of duration T in each traffic channel BH cycle, the acquisition dwell resolution defines a quantity Y of acquisition time slots of duration S in each acquisition channel BH cycle, and S=T*R, wherein R, X, and Y are each positive integers, and S and T are positive rational numbers; and generating, by the SRAN for each beam of the multi-beam satellite communication system, a corresponding micro-level BH configuration having Y*R dwell time slots of duration T, the generating comprising:

determining a corresponding C communication cells as serviced by the beam, wherein C is a positive integer;

assigning, based on the macro-level BH configuration, C*R of the dwell time slots as a portion of the acquisition time slots for the beam and a remaining portion of the dwell time slots to use as the traffic time slots for the beam; and determining a corresponding dwell duration for each of the C communication cells in each of at least (Y−C)*R/X traffic channel BH cycles for the beam based on the present network data.

2. The method of claim 1, further comprising:

communicating, by the SRAN to the operations center, the present network data for communication cells of the multi-beam satellite communication system, the present network data indicating present network resource supply and demand, wherein the receiving is based on the communicating.

3. The method of claim 1, further comprising:

directing, by the SRAN, the multi-beam satellite communication system to sequentially activate beams to communicate traffic channel signals and acquisition channel signals according to the micro-level BH configurations for the beams.

4. The method of claim 1, wherein:

the SRAN is configured to communicate according to terrestrial waveform numerologies that define supported subcarrier spacings and associated supported time slot durations; and the traffic dwell resolution of the macro-level BH configuration is generated to define the quantity X of traffic time slots of duration T in each traffic channel BH cycle so that T is a multiple of one of the supported time slot durations.

5. The method of claim 4, wherein:

the terrestrial waveform numerologies further associate a nominal cyclic prefix (CP) duration for each supported time slot duration;

the multi-beam satellite communication system is configured to operate within a timing synchronization error including a beam switching time; and the traffic dwell resolution of the macro-level BH configuration is generated so that T is a multiple of one of the supported time slot durations associated with a nominal CP duration that is larger than the timing synchronization error.

6. The method of claim 1, wherein:

the beams of the multi-beam satellite communication system are N traffic and control (TnC) beams, and the multi-beam satellite communication system further supports one positioning, navigation, and timing (PNT) beam, wherein N is a positive integer.

7. The method of claim 6, wherein:

the multi-beam satellite communication system has a geographic coverage area corresponding to Y communication cells and P PNT cells, wherein P is an integer greater than Y; and the generating the macro-level BH configuration further comprises defining a PNT channel BH cycle for the PNT beam as having P PNT time slots distributed over a PNT cycle duration.

8. The method of claim 6, wherein the N TnC beams service Y communication cells, such that $$\sum_{j=1}^{N} C_j = Y.$$

9. The method of claim 8, wherein the assigning the C*R of the dwell time slots as the acquisition time slots comprises staggering assigning the dwell times slots for each TnC beam to avoid overlapping with the acquisition time slots for any other of the TnC beams.

10. The method of claim 1, wherein the SRAN is configured to communicate according to terrestrial waveform numerologies that define supported channel bandwidths, each having an associated supported subcarrier spacing, and further comprising:

configuring transceivers of the multi-beam satellite communication system to communicate in a satellite channel bandwidth that is not one of the supported channel bandwidths by:

identifying one of the supported channel bandwidths as a lowest of the supported channel bandwidths that is greater than or equal to the satellite channel bandwidth;

identifying the supported subcarrier spacing associated with the identified one of the supported channel bandwidths;

computing a largest resource block (RB) quantity, such that a product of the RB quantity, a predefined number of subcarriers per RB, and the identified supported subcarrier spacing yields a channel pseudo-bandwidth that is closest to the satellite channel bandwidth without exceeding the satellite channel bandwidth; and reserving any remainder between the satellite channel bandwidth and the channel pseudo-bandwidth as a guard band.

11. A distributed unit (DU) of a satellite radio access network (SRAN) for beam hopping in an integrated terrestrial-non-terrestrial network (iTNTN) the SRAN with a multi-beam satellite communication system, the DU comprising:

one or more processors;

a non-transitory memory having instructions stored thereon which, when executed, cause the one or more processors to perform steps comprising:

receiving, from an operations center, a macro-level beam hopping (BH) configuration generated based on present network data and on a projected demand for satellite resources, the macro-level BH configuration defining at least a traffic cycle duration and a traffic dwell resolution for a traffic channel BH cycle, and an acquisition cycle duration and an acquisition dwell resolution for an acquisition channel BH cycle, such that the traffic dwell resolution defines a quantity X of traffic time slots of duration T in each traffic channel BH cycle, the acquisition dwell resolution defines a quantity Y of acquisition time slots of duration S in each acquisition channel BH cycle, and S=T*R, wherein R, X, and Y are each positive integers, and S and T are positive rational numbers; and generating, for each beam of the multi-beam satellite communication system, a corresponding micro-level BH configuration having Y*R dwell time slots of duration T, by:

determining a corresponding C communication cells as serviced by the beam, wherein C is a positive integer;

assigning, based on the macro-level BH configuration, C*R of the dwell time slots as a portion of the acquisition time slots for the beam and a remaining portion of the dwell time slots to use as the traffic time slots for the beam; and determining a corresponding dwell duration for each of the C communication cells in each of at least (Y−C)*R/X traffic channel BH cycles for the beam based on the present network data.

12. The DU of claim 11, wherein the steps further comprise:

communicating, to the operations center, the present network data for communication cells of the multi-beam satellite communication system, the present network data indicating present network resource supply and demand, wherein the receiving is based on the communicating.

13. The DU of claim 11, wherein the steps further comprise:

directing the multi-beam satellite communication system to sequentially activate beams to communicate traffic channel signals and acquisition channel signals according to the micro-level BH configurations for the beams.

14. The DU of claim 11, wherein:

the SRAN is configured to communicate according to terrestrial waveform numerologies that define supported subcarrier spacings and associated supported time slot durations; and the traffic dwell resolution of the macro-level BH configuration is generated to define the quantity X of traffic time slots of duration T in each traffic channel BH cycle so that T is a multiple of one of the supported time slot durations.

15. The DU of claim 14, wherein:

the terrestrial waveform numerologies further associate a nominal cyclic prefix (CP) duration for each supported time slot duration;

the multi-beam satellite communication system is configured to operate within a timing synchronization error including a beam switching time; and the traffic dwell resolution of the macro-level BH configuration is generated to so that T is a multiple of one of the supported time slot durations associated with a nominal CP duration that is smaller than the timing synchronization error.

16. The DU of claim 11, wherein:

the beams of the multi-beam satellite communication system are N traffic and control (TnC) beams, and the multi-beam satellite communication system further supports one positioning, navigation, and timing (PNT) beam, wherein N is a positive integer.

17. The DU of claim 16, wherein:

the multi-beam satellite communication system has a geographic coverage area corresponding to Y communication cells and P PNT cells, wherein P is an integer greater than Y; and the macro-level BH configuration is generated further to define a PNT channel BH cycle for the PNT beam as having P PNT time slots distributed over a PNT cycle duration.

18. The DU of claim 16, wherein the N TnC beams service Y communication cells, such that $$\sum_{j=1}^{N} C_j = Y.$$

19. The DU of claim 18, wherein the assigning the C*R of the dwell time slots as the acquisition time slots comprises staggering assigning the dwell times slots for each TnC beam to avoid overlapping with the acquisition time slots for any other of the TnC beams.

20. The DU of claim 11, wherein:

the SRAN is configured to communicate according to terrestrial waveform numerologies that define supported channel bandwidths, each having an associated supported subcarrier spacing; and the steps further comprise configuring transceivers of the multi-beam satellite communication system to communicate in a satellite channel bandwidth that is not one of the supported channel bandwidths by:

identifying one of the supported channel bandwidths as the lowest of the supported channel bandwidths that is greater than or equal to the satellite channel bandwidth;

identifying the supported subcarrier spacing associated with the identified one of the supported channel bandwidths;

computing a largest resource block (RB) quantity, such that a product of the RB quantity, a predefined number of subcarriers per RB, and the identified supported subcarrier spacing yields a channel pseudo-bandwidth that is closest to the satellite channel bandwidth without exceeding the satellite channel bandwidth; and reserving any remainder between the satellite channel bandwidth and the channel pseudo-bandwidth as a guard band.

* * * * *